United States Patent
Tomeba et al.

(10) Patent No.: US 9,185,577 B2
(45) Date of Patent: Nov. 10, 2015

(54) TRANSMISSION APPARATUS, RECEPTION APPARATUS, WIRELESS COMMUNICATION SYSTEM, CONTROL PROGRAM AND INTEGRATED CIRCUIT

(75) Inventors: Hiromichi Tomeba, Osaka (JP); Minoru Kubota, Osaka (JP); Takashi Onodera, Osaka (JP); Shimpei To, Osaka (JP); Kozue Hirata, Osaka (JP); Hiroshi Nakano, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 369 days.

(21) Appl. No.: 13/700,754

(22) PCT Filed: May 13, 2011

(86) PCT No.: PCT/JP2011/061035
§ 371 (c)(1),
(2), (4) Date: Feb. 8, 2013

(87) PCT Pub. No.: WO2011/152186
PCT Pub. Date: Dec. 8, 2011

(65) Prior Publication Data
US 2013/0136050 A1   May 30, 2013

(30) Foreign Application Priority Data
May 31, 2010  (JP) .................. 2010-125305

(51) Int. Cl.
*H04W 24/02* (2009.01)
*H04B 7/04* (2006.01)
(Continued)

(52) U.S. Cl.
CPC ............. *H04W 24/02* (2013.01); *H04B 7/0452* (2013.01); *H04J 11/0033* (2013.01); *H04L 1/0625* (2013.01); *H04L 1/0656* (2013.01); *H04L 25/4975* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 2007/0064632 | A1* | 3/2007 | Zheng et al. | 370/281 |
| 2007/0253508 | A1* | 11/2007 | Zhou et al. | 375/267 |
| 2012/0082256 | A1* | 4/2012 | Gaur et al. | 375/260 |

FOREIGN PATENT DOCUMENTS

| | | |
|---|---|---|
| EP | 2 037 646 A2 | 3/2009 |
| JP | 2009-71825 A | 4/2009 |
| JP | 2010-28384 A | 2/2010 |

OTHER PUBLICATIONS

Harashima et al., "Matched-Transmission Technique for Channels With Intersymbol Interference", IEEE Transactions on Communications, vol. 20, No. 4, Aug. 1972, pp. 774-780.

(Continued)

*Primary Examiner* — Diane Lo
(74) *Attorney, Agent, or Firm* — Birch, Stewart, Kolasch & Birch, LLP

(57) ABSTRACT

To realize transmission performances equivalent to those of an MU-MIMO BLAST ZF-THP system without increasing a signal processing amount in a base station apparatus in a downlink MU-MIMO transmission system. A transmission apparatus is provided with a plurality of transmission antennas, generates a transmission signal addressed to each reception apparatus based on information indicating spatial correlation of channels to and from a plurality of reception apparatuses, space-multiplexes the generated each transmission signal in the same wireless resource, and transmits it to each reception apparatus. The transmission apparatus includes: an ordering determination part 601 which determines an order in which a transmission signal addressed to each reception apparatus is generated based on information indicating spatial correlation of channels; a linear filter generation part 603 which generates a linear filter based on the determined order; a THP part 605 which performs a THP process by using the determined order and the linear filter; and a linear filter multiplication part 607 which multiplies an output of the THP part 605 by the linear filter.

7 Claims, 15 Drawing Sheets

(51) Int. Cl.
  *H04L 1/06*     (2006.01)
  *H04L 25/497*   (2006.01)
  *H04J 11/00*    (2006.01)
  *H04L 27/26*    (2006.01)

(56) References Cited

OTHER PUBLICATIONS

International Search Report for PCT/JP2011/061035 dated Jul. 5, 2011.

Jia et al., "A Study on Control Information Transmission of Multiuser MIMO", The Institute of Electronics, Information and Communication Engineers Sogo Taikai Koen Ronbunshu Tsushin 1, Mar. 2, 2010, p. 495.

Joham et al., "MMSE Approaches to Multiuser Spatio-Temporal Tomlinson-Harashima Precoding", Proc. 5th Int. ITG Conf. on Source and Channel Coding, Jan. 2004.

Liu et al., "Improved Tomlinson-Harashima Precoding for the Downlink of Multiple Antenna Multi-User Systems", IEEE Communications Society, Wireless Communications and Networking Conference, Mar. 17, 2005, pp. 466-472.

Nakano et al., "Adaptive THP Scheme Control for Downlink MU-MIMO Systems", IEICE Technical Report, Feb. 24, 2010, vol. 109, No. 440, pp. 203-208.

* cited by examiner

TRANSMISSION APPARATUS, RECEPTION APPARATUS, WIRELESS COMMUNICATION SYSTEM, CONTROL PROGRAM AND INTEGRATED CIRCUIT

TECHNICAL FIELD

The present invention relates to a mobile communication technology, in particular, to a technology for realizing high transmission performances in a downlink MU-MIMO transmission system without increasing a signal processing amount in a base station apparatus.

BACKGROUND ART

In Long Term Evolution (LTE) of which standardization has been promoted in 3rd Generation Partnership Project (3GPP) as a 3.9th generation wireless transmission system, for extensive improvement of spectrum efficiency from a third generation wireless transmission system, a Multiple Input Multiple Output (MIMO) technology in which wireless transmission is performed using a plurality of transmitting-receiving antennas has been standardized. Based on a space-multiplexing (SDM) technology which is one of the MIMO technology, enhancing in a throughput can be realized without expanding a frequency bandwidth. In addition, currently, LTE-Advanced (LTE-A) has been proposed as a most-likely candidate of a 4th generation wireless transmission system, and standardization activities thereof have been performed actively. In order to achieve a peak throughput of 1 Gbps in a downlink transmission (base station apparatus to mobile station apparatus) in LTE-A, Single User MIMO (SU-MIMO) in which space-multiplexing up to 8 streams is possible has been investigated. SU-MIMO is a MIMO transmission between a base station apparatus having a plurality of transmission antennas and a single mobile station apparatus having a plurality of reception antennas.

However, there is a limit to the number of reception antennas which can be arranged in a mobile station apparatus. Then, it is considered that adopting Multi-user MIMO (MU-MIMO) in which a plurality of mobile station apparatuses carrying out concurrent access forms a virtual large-scale antenna array and in which transmission signals from a base station apparatus to each of the mobile station apparatuses is made to be space-multiplexed is indispensable to improvement of spectrum efficiency. Although MU-MIMO has already been standardized also in LTE, MU-MIMO adopted in LTE is a system referred to as a beam-forming which carries out multiplication of linear filters in a base station apparatus. In this case, since only the space-multiplexing between users such that space-multiplexed transmission signals between users are orthogonal can be performed, there is a limit to the improvement of spectrum efficiency.

Recently, an MU-MIMO technology where a nonlinear process is performed in a base station apparatus side attracts an attention, and investigation of an MU-MIMO THP technology using a nonlinear interference suppression technology which is referred to as Tomlinson Harashima Precoding (THP) such as in particular described in Non-patent Document 1 is active. MU-MIMO THP is a method where a base station apparatus carries out a modulo (Modulo) calculation and performs transmission after subtracting in advance interferences which the mobile station apparatus receives from a desired signal addressed to each of mobile station apparatuses. Performing the Modulo operation enables the signal after the interference subtraction to be prevented from diverging and an increase of a transmit power to be suppressed. The mobile station apparatus, by performing the Modulo operation again for each reception signal, can detect the desired signal with interferences removed.

MU-MIMO THP can suppress an inter-user interferences (IUI) while suppressing the divergence of the transmit power by the Modulo operation, and therefore, can realize excellent transmission performances. Meanwhile, MU-MIMO THP, by rearranging appropriately an order in which transmission signals addressed to each terminal are calculated (this is referred to as ordering), can achieve an extensive improvement of transmission performances. As an MU-MIMO THP system in which the ordering is performed, a BLAST ZF-THP system has been proposed in Non-patent Document 2.

PRIOR ART DOCUMENT

Non-Patent Document

Non-patent Document 1: H. Harashima and H. Miyakawa, "Matched-transmission technique for channels with intersymbol interference," IEEE Trans. Commun., Vol. 20, No. 4, pp. 774-780, August 1972.

Non-patent Document 2: M. Joham, J. Brehmer, and W Utschick, "MMSE Approaches to Multiuser Spatio-Temporal Tomlinson-Harashima Precoding," Proc. 5th Int. ITG Conf. on Source and Channel Coding, Erlangen, Germany, January 2004.

SUMMARY OF THE INVENTION

Problems to be Solved by the Invention

However, although it is effective for the improvement of spectrum efficiency in MU-MIMO THP to perform ordering on transmission symbols, in the MU-MIMO BLAST ZF-THP system which is a conventional technology, there arises a problem that a signal processing amount in a base station apparatus will increase greatly as the number of concurrent access users increase.

The present invention is accomplished in view of such a situation, and has an object to provide a transmission apparatus, a reception apparatus, a wireless communication system, a control program and an integrated circuit which are capable of realizing transmission performances equivalent to those of the MU-MIMO BLAST ZF-THP system without making increasing a signal processing amount in the base station apparatus in the downlink MU-MIMO transmission system.

Means for Solving the Problems (1) In order to achieve the above-mentioned object, the present invention has taken the following means. That is, the transmission apparatus of the present invention is a transmission apparatus which is provided with a plurality of transmission antennas and transmits a wireless signal to a plurality of reception apparatuses, wherein based on information indicating spatial correlation of channels between the transmission apparatus and the plurality of reception apparatuses, a transmission signal addressed to the each reception apparatus is generated, and the generated each transmission signal is space-multiplexed in the same wireless resource, and transmitted to the each reception apparatus.

In this way, based on information indicating spatial correlation of channels to and from the plurality of reception apparatuses, a transmission signal addressed to the each reception apparatus is generated, and the each generated transmission signal is space-multiplexed in the same wireless resource, and transmitted to each reception apparatus, and therefore, even if the number of users increases greatly, it becomes possible to suppress an increase in a calculation amount in the transmission apparatus. Consequently, spectrum efficiency increases in proportion to the number of users, and it becomes possible to enhance a transmission speed of the whole system dramatically.

(2) In addition, the transmission apparatus of the present invention comprises: an ordering determination part determining an order in which a transmission signal addressed to the each reception apparatus is generated based on the information indicating spatial correlation of channels; a linear filter generation part generating a linear filter based on the determined order; a THP part performing THP (Tomlinson Harashima Precoding) processing by using the determined order and the linear filter; and a linear filter multiplication part multiplying an output of the THP part by the linear filter.

This configuration enables to suppress an increase in a calculation amount in the transmission apparatus, even if the number of users increases greatly. Thereby, spectrum efficiency increases in proportion to the number of users, and it becomes possible to enhance a transmission speed of the whole system dramatically.

(3) Moreover, in the transmission apparatus of the present invention, the information indicating spatial correlation of channels is a transmission correlation coefficient indicating correlation among the plurality of transmission antennas.

Thus, because of using a transmission correlation coefficient, repeating processing is not required like a conventional way, and it becomes possible to reduce a calculation amount. Accordingly, spectrum efficiency increases in proportion to the number of users, and it becomes possible to enhance a transmission speed of the whole system dramatically.

(4) Furthermore, in the transmission apparatus of the present invention, the transmission correlation coefficient is acquired based on at least one of information notified from the plurality of reception apparatuses, and information estimated in its own apparatus.

In this way, since the transmission correlation coefficient is acquired based on at least one of information notified from the plurality of reception apparatuses, or information estimated in its own apparatus, repeating processing is not required like a conventional way, and it becomes possible to reduce a calculation amount. Consequently, spectrum efficiency increases in proportion to the number of users, and it becomes possible to enhance a transmission speed of the whole system dramatically.

(5) In addition, the transmission apparatus of the present invention generates a transmission signal addressed to the each reception apparatus in association with the transmission correlation coefficient.

Thus, since a transmission signal addressed to the each reception apparatus is generated in association with the transmission correlation coefficient, even if the number of users increases greatly, it becomes possible to suppress an increase in a calculation amount in the transmission apparatus. Thereby, spectrum efficiency increases in proportion to the number of users, and it becomes possible to enhance a transmission speed of the whole system dramatically.

(6) Moreover, the transmission apparatus of the present invention generates a transmission signal addressed to the each reception apparatus successively from a transmission signal addressed to a reception apparatus the transmission correlation coefficient of which is large.

In this way, since a transmission signal addressed to the each reception apparatus is generated sequentially from a transmission signal addressed to a reception apparatus the transmission correlation coefficient of which is large, even if the number of users increases greatly, it becomes possible to suppress an increase in a calculation amount in the transmission apparatus. Accordingly, spectrum efficiency increases in proportion to the number of users, and it becomes possible to enhance a transmission speed of the whole system dramatically.

(7) Furthermore, the transmission apparatus of the present invention generates a transmission signal addressed to the each reception apparatus sequentially without depending on wireless resources allocated to the each reception apparatus.

Thus, since a transmission signal addressed to the each reception apparatus is generated sequentially without depending on wireless resources allocated to the each reception apparatus, even if the number of users increases greatly, it becomes possible to suppress an increase in a calculation amount in the transmission apparatus. Consequently, spectrum efficiency increases in proportion to the number of users, and it becomes possible to enhance a transmission speed of the whole system dramatically.

(8) In addition, the transmission apparatus of the present invention determines an antenna port to be used by determining an order in which a transmission signal addressed to the each reception apparatus is generated based on the information indicating spatial correlation of channels.

By this configuration, it becomes possible to control an antenna port to be used, based on spatial correlation.

(9) Moreover, a reception apparatus of the present invention is the reception apparatus which receives a wireless signal from a transmission apparatus provided with a plurality of transmission antennas, and includes: a reception part receiving a wireless signal from the transmission apparatus; a correlation information estimation part estimating a transmission correlation coefficient of each transmission antenna of the transmission apparatus from the received wireless signal; and a transmission part transmitting the transmission correlation coefficient or information indicating the transmission correlation coefficient to the transmission apparatus.

This configuration enables to suppress an increase in a calculation amount in the transmission apparatus, even if the number of users increases greatly. Thereby, spectrum efficiency increases in proportion to the number of users, and it becomes possible to enhance a transmission speed of the whole system dramatically.

(10) Furthermore, a wireless communication system of the present invention includes: the transmission apparatus according to any of above-mentioned (1) to (8); and the reception apparatus according to above-mentioned (9).

This configuration enables to suppress an increase in a calculation amount in the transmission apparatus, even if the number of users increases greatly. Accordingly, spectrum efficiency increases in proportion to the number of users, and it becomes possible to enhance a transmission speed of the whole system dramatically.

(11) In addition, the control program of the present invention is a control program of a transmission apparatus which is provided with a plurality of transmission antennas and transmits a wireless signal to a plurality of reception apparatuses, the control program converting a series of processes into commands so as to enable a computer to read and execute them, the series of processes comprising: determining an order in which a transmission signal addressed to the each reception apparatus is generated based on information indicating spatial correlation of channels between the transmission apparatus and the plurality of reception apparatuses; generating a linear filter based on the determined order; performing THP (Tomlinson Harashima Precoding) by using the determined order and the linear filter; multiplying an output after the THP process by the linear filter; generating a transmission signal addressed to the each reception apparatus based on the determined order; space-multiplexing the generated each transmission signal in the same wireless resource; and transmitting the each transmission signal to the each reception apparatus.

In this way, based on information indicating spatial correlation of channels to and from the plurality of reception apparatuses, a transmission signal addressed to the each reception apparatus is generated, and the generated each transmission signal is space-multiplexed in the same wireless resource and transmitted to the each reception apparatus, and therefore, even if the number of users increases greatly, it becomes possible to suppress an increase in a calculation amount in the transmission apparatus. Consequently, spectrum efficiency increases in proportion to the number of users, and it becomes possible to enhance a transmission speed of the whole system dramatically.

(12) Furthermore, the integrated circuit of the present invention is an integrated circuit causing a transmission apparatus to exert a plurality of functions by being mounted in the transmission apparatus, the functions comprising a series of functions of: transmitting a wireless signal to a plurality of reception apparatuses by using a plurality of transmission antennas; determining an order in which a transmission signal addressed to the each reception apparatus is generated based on information indicating spatial correlation of channels between the transmission apparatus and the plurality of reception apparatuses; generating a linear filter based on the determined order; performing a THP (Tomlinson Harashima Precoding) process by using the determined order and the linear filter; multiplying an output after the THP process by the linear filter; generating a transmission signal addressed to the each reception apparatus based on the determined order; space-multiplexing the generated each transmission signal in the same wireless resource; and transmitting the each transmission signal to the each reception apparatus.

Thus, based on information indicating spatial correlation of channels to and from the plurality of reception apparatuses, a transmission signal addressed to the each reception apparatus is generated, and the generated each transmission signal is space-multiplexed in the same wireless resource, and transmitted to the each reception apparatus, and therefore, even if the number of users increases greatly, it becomes possible to suppress an increase in a calculation amount in the transmission apparatus. Thereby, spectrum efficiency increases in proportion to the number of users, and it becomes possible to enhance a throughput of the whole system dramatically.

Effect of the Invention

According to the present invention, since a signal processing amount required for a nonlinear downlink MU-MIMO can be reduced greatly, feasibility of the nonlinear MU-MIMO is enhanced dramatically. In addition, since an increase of a signal processing amount accompanied by an increase of the number of concurrent access users can be suppressed greatly, the number of concurrent access users can be increased easily, which can contribute to extensive increase in spectrum efficiency.

BEST MODES FOR CARRYING OUT THE INVENTION

Before description of embodiments of the present invention, an MU-MIMO THP system and an MU-MIMO BLAST ZF-THP system which are background arts will be described.

1. MU-MIMO THP

A case where a base station apparatus having $N_t$ transmission antennas, and mobile station apparatuses (user) of U units each having a single reception antenna communicate with each other is considered. First, when a complex channel gain between the n-th transmission antenna ($n=1, \ldots, N_t$) of the base station apparatus and the u-th user ($u=1, \ldots, U$) is set as $h_{u,n}$, a channel matrix H is defined by the following formula.

[Formula 1]

$$H = \begin{pmatrix} h_{1,1} & \cdots & h_{1,N_t} \\ \vdots & \ddots & \vdots \\ h_{U,1} & \cdots & h_{U,N_t} \end{pmatrix} \quad (1)$$

In the MU-MIMO THP system, the base station apparatus needs to know the channel matrix H in advance. Here, channel state information is ideally notified from each of mobile station apparatuses, and the base station apparatus is supposed to have known the channel matrix H ideally.

Figure 9:
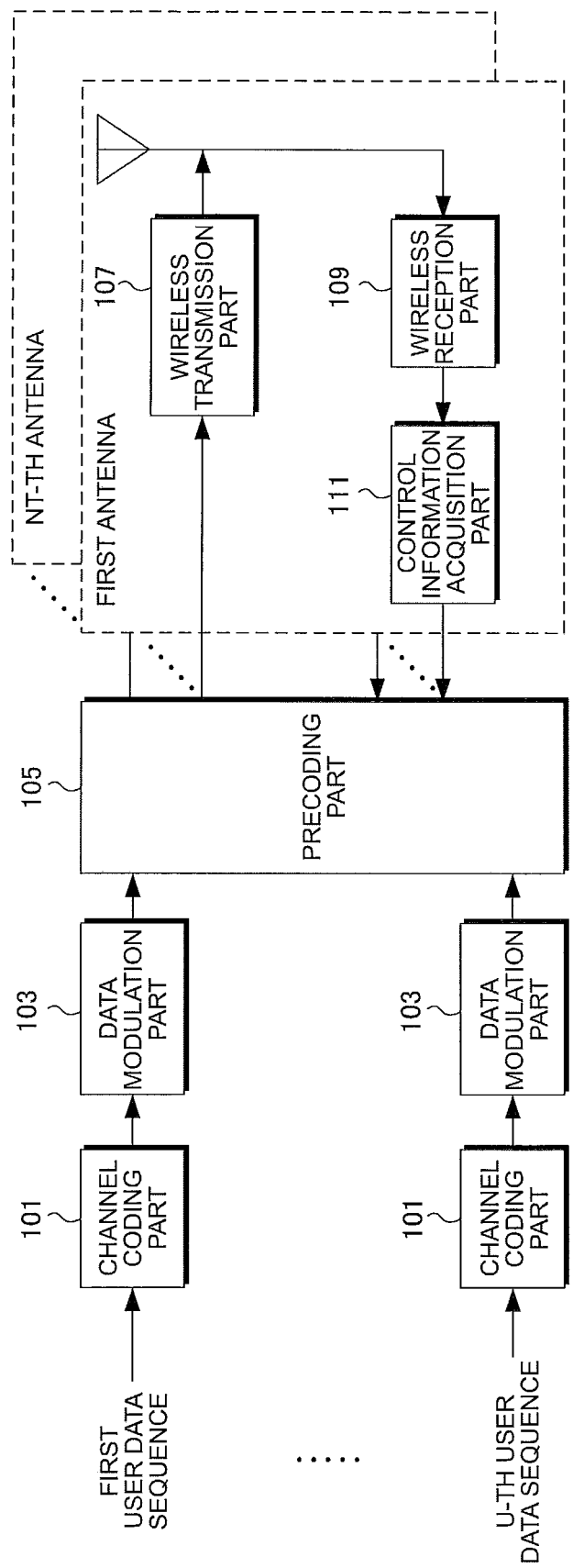
FIG. 9 is a block diagram showing a configuration of a base station apparatus.

FIG. 9 is a block diagram showing a base station apparatus configuration. A signal processing in the base station apparatus will be described using FIG. 9. A transmission-data sequence of each user, after channel coding is performed in a channel coding part 101, is data-modulated into QPSK, 16QAM or the like in a data modulation part 103. After that, a transmission symbol of each user is input into a Precoding part 105.

Figure 10:
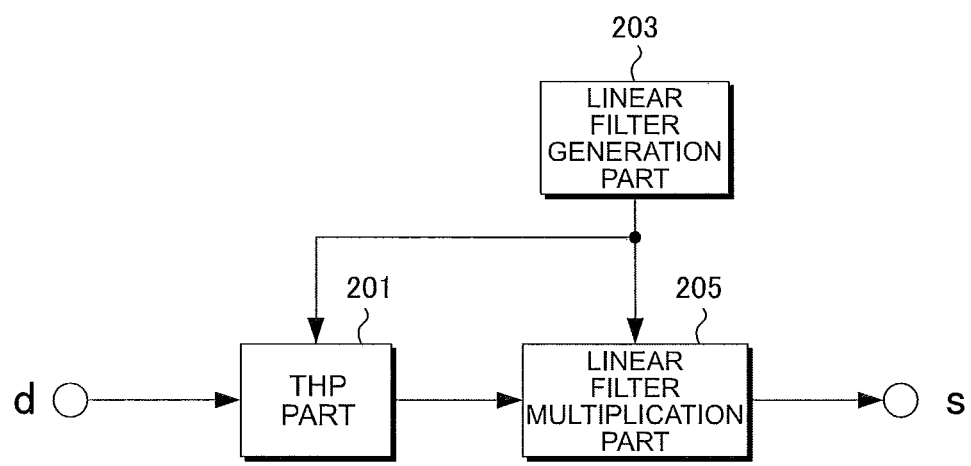
FIG. 10 is a block diagram showing a configuration of a Precoding part 105.

FIG. 10 is a block diagram showing a configuration of a Precoding part 105. In the Precoding part 105, a transmission symbol vector d is input into a THP part 201, and in the THP part 201, an interference suppression process based on the channel matrix H and a linear filter W calculated in a linear filter generation part 203 is carried out. An output signal of the THP part 201 is input into a linear filter multiplication part 205, and multiplication of the linear filter W and normalization of a transmit power are performed, and a transmission signal vector s is output from the Precoding part 105.

A signal processing in the Precoding part 105 will be described. Note that the transmission symbol of the u-th user input into the Precoding part 105 is set as $\{d_u; u=1, \ldots, U\}$, and the transmission symbol vector is defined as $d=[d_1, \ldots, d_U]^T$. Here, $[.]^T$ indicates transposition operation. In addition, channel state information is fed back ideally to the base station apparatus from each of mobile station apparatuses, and input into the Precoding part 105. In the Precoding part 105, first, the linear filter W is calculated in the linear filter generation part 203, and the linear filter W is such linear filter as HW becomes a lower triangular matrix for the channel matrix H. W can be calculated from QR decomposition of H. When an Hermitian transposed matrix of H is set as $(H)^H$ and the QR decomposition is applied to $(H)^H$, the following formula is acquired.

[Formula 2]

$$H^H = QR$$

$$\therefore HQ = R^H \quad (2)$$

Here, since Q is a unitary matrix and R is an upper triangular matrix, the linear filter W with HW as the lower triangular matrix becomes W=Q.

By multiplying the transmission symbol vector d by W, the transmission signal vector $s=[s_1, \ldots, s_{Nt}]^T$ can be calculated.

[Formula 3]

$$S = Wd \quad (3)$$

Suppose that a transmission signal vector of Formula (3) has been transmitted from the base station apparatus. When a reception signal received in the mobile station apparatus of the u-th user is set as $\{r_u; u=1, U\}$, a reception signal vector $r=[r_1, \ldots, r_U]^T$ with the reception signal of each user as an element is given by the following formula.

[Formula 4]

$$r = Hs + \eta \quad (4)$$

Here, $\eta = [\eta_1, \ldots, \eta_U]^T$ indicates a noise added in each of mobile station apparatuses. In the following, for simplicity, description is carried out while a noise term is disregarded. Formula (4) can be developed like the following formula.

[Formula 5]

$$r = Hs = HQd = R^H d = \begin{pmatrix} a_{1,1} & 0 & \cdots & 0 \\ a_{2,1} & a_{2,2} & \cdots & 0 \\ \vdots & \vdots & \ddots & \vdots \\ a_{U,1} & a_{U,2} & \cdots & a_{U,U} \end{pmatrix} \begin{pmatrix} d_1 \\ d_2 \\ \vdots \\ d_U \end{pmatrix} \quad (5)$$

Here, $a_{i,j}$ indicates the i-th row and j-th column component of a lower triangular matrix $R^H$. From Formula (5), it is understood that although a first user can receive only a transmission symbol of its own, the transmission symbol of the first user has given an interference to a reception signal of a second user. That is, transmission symbols of the first to (u−1)-th users are included in the reception signal of the u-th user as interferences.

Therefore, in the Precoding part 105 of the base station apparatus, interference components observed by each of these mobile station apparatuses are subtracted in advance based on THP. For example, as the transmission signal to the second user, the following formula is assumed to be transmitted.

[Formula 6]

$$x_2 = d_2 - \frac{a_{2,1}}{a_{2,2}} d_1 \quad (6)$$

It is understood that if $x_2$ expressed by Formula (6) is substituted for the $d_2$ part of Formula (5), the second user can receive only the transmission symbol $d_2$ of its own without receiving interferences from the transmission symbol of the first user. Hereinafter, in the same way, performing transmission after subtracting transmission symbols of the first to (u−1)-th users in advance from the transmission signal of the u-th user allows all the users to perform communication without receiving interferences.

Figure 11:
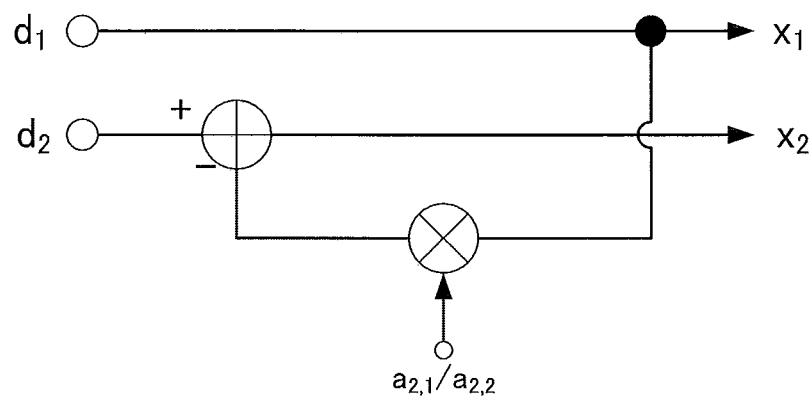
FIG. 11 is a figure where a process of Formula (6) is expressed as a feedback filter.

FIG. 11 is a figure expressing a process of Formula (6) as a feedback filter. However, since a tap coefficient of this feedback filter is determined depending on the channel matrix H, the feedback filter output may diverge depending on a state of the channel. This means that a huge transmit power is needed for transmitting a THP output signal $x_2$, and it is unrealistic.

Figure 12:
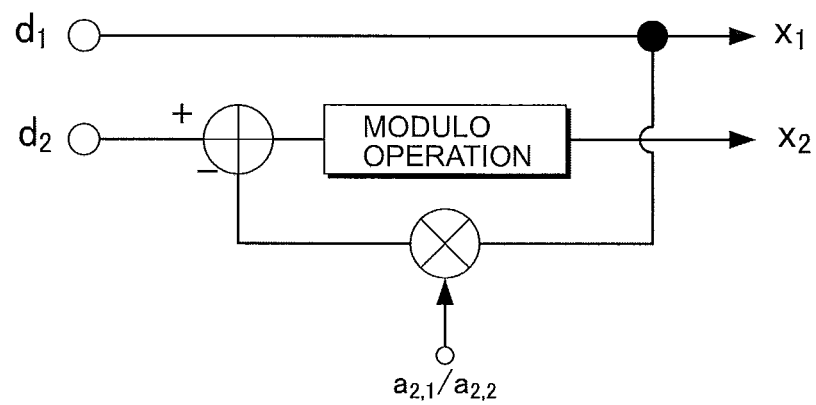
FIG. 12 is a figure showing a feedback filter to which a Modulo operation is applied.

FIG. 12 is a figure showing a feedback filter with a Modulo operation applied. As shown in FIG. 12, in THP, by applying the Modulo operation whenever subtraction of an interference signal is performed, divergence of the THP output signal is suppressed.

Figure 13:
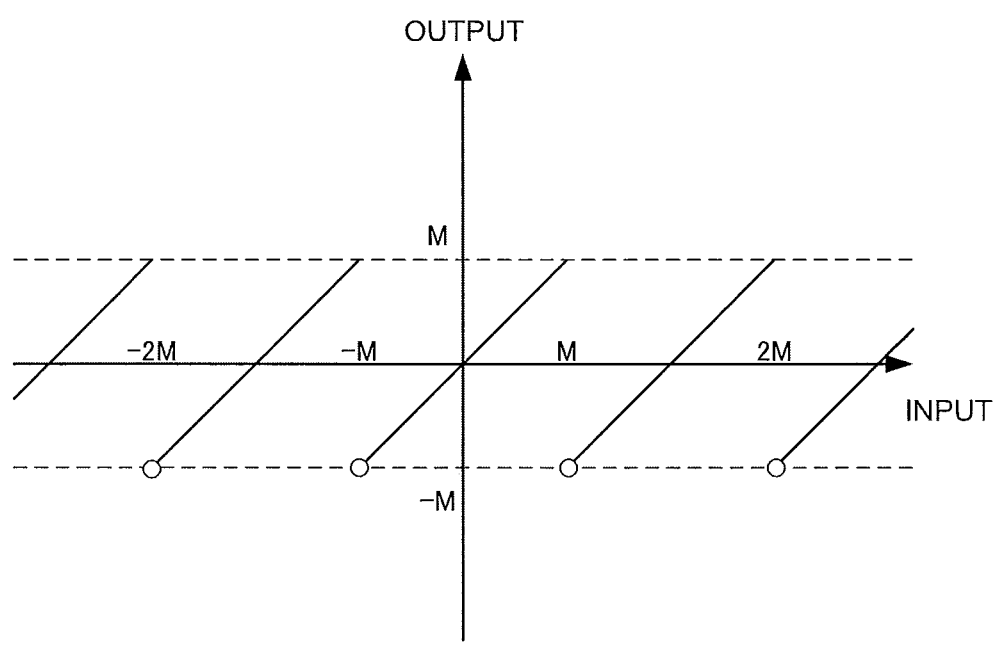
FIG. 13 is a figure showing a concept of a Modulo operation $\text{Mod}_M(x)$.

FIG. 13 is a figure showing a concept of the Modulo operation $\text{Mod}_M(x)$. As shown in FIG. 13, the Modulo operation $\text{Mod}_M(x)$ is one which makes, for a certain input x, an output thereof be larger than −M and not more than M. Here, it is supposed that M is referred to as a Modulo width. Actually, in the case of applying the Modulo operation to an interference suppression output expressed by Formula (6), an output thereof is given by the following formula.

[Formula 7]

$$\text{Mod}_M(x_2) = d_2 - \frac{a_{2,1}}{a_{2,2}} d_1 + 2Mz \quad (7)$$

Here, $z_{t,2}$ is a complex number in which a real part and an imaginary part are each an integer number, and is selected so that the real part and imaginary part of the right-hand side of Formula (7) may be each larger than −M and not more than M. This $z_{t,2}$ is referred to as an equivalent expression of the Modulo operation.

Returning to FIG. 10, in the Precoding part 105 of the base station apparatus, the input transmission symbol vector d is input into the THP part 201. Then, based on the linear filter W and the channel matrix H which are generated in the linear filter generation part 203, a THP output x as shown in the following formula is output from the THP part 201.

[Formula 8]

$$x = d - ((\mathrm{diag}(HW))^{-1}HW - I_U)x + 2Mz_t \tag{8}$$

Here, diag (A) indicates a diagonal matrix with a diagonal component of a matrix A as an element. $A^{-1}$ indicates an inverse matrix of the matrix A. $z_t = [z_{t,1}, \ldots, z_{t,U}]^T$ indicates the equivalent expression of the Modulo operation for a transmission signal addressed to each of mobile station apparatuses. $I_m$ indicates a unit matrix of m×m. After that, the output x of the THP part 201 is input into the linear filter multiplication part 205, and linear filter multiplication and normalization of a transmit power are performed. An output s of the linear filter multiplication part 205 is given by the following formula.

[Formula 9]

$$s = \beta W x \tag{9}$$

Here, $\beta$ is a transmit power normalization term for making equal the transmit power of the output signal s of the linear filter multiplication part 205 and the transmission symbol vector d that is the input signal of the Precoding part 105, and is given by the following formula.

[Formula 10]

$$\beta = \sqrt{\frac{1}{\mathrm{tr}(WE[xx^H]W^H)}} \tag{10}$$

Here, tr (·) indicates a trace operation of a matrix and E[·] indicates an ensemble average. The Precoding part 105 of the base station apparatus outputs finally the transmission signal vector s given by Formula (9).

After that, in the base station apparatus, the output s of the Precoding part 105 is input into a wireless transmission part 107 of each corresponding transmission antenna. In the wireless transmission part 107, a baseband transmission signal is converted into a radio frequency (RF) band transmission signal. An output signal of the wireless transmission part 107 is each transmitted from each transmission antenna.

Figure 14:
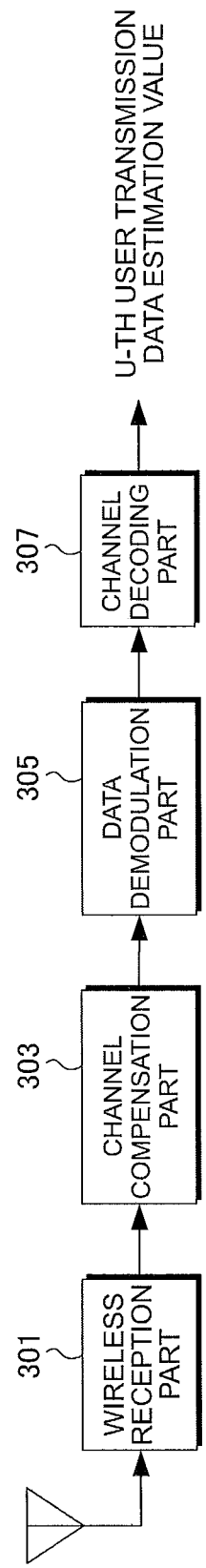
FIG. 14 is a block diagram showing a configuration of a mobile station apparatus.

FIG. 14 is a block diagram showing a configuration of a mobile station apparatus. In the mobile station apparatus, a signal received by a reception antenna is input into a wireless reception part 301, and is converted into a baseband signal in the wireless reception part 301. The reception signal converted into a baseband is given by the following formula.

[Formula 11]

$$r = Hs = \beta HWx = \beta R^H x \tag{11}$$

Here, because the following formula is acquired from Formula (8),

[Formula 12]

$$x = (HW)^{-1}\{\mathrm{diag}(HW)\}(d + 2Mz_t) \tag{12}$$

The following formula is acquired by substituting Formula (12) for Formula (11).

[Formula 13]

$$r = \beta\{\mathrm{diag}(R^H)\}(d + 2Mz_t) = \beta\begin{pmatrix} a_{1,1} & 0 & \cdots & 0 \\ 0 & a_{2,2} & \cdots & 0 \\ \vdots & \vdots & \ddots & \vdots \\ 0 & 0 & \cdots & a_{U,U} \end{pmatrix}(d + 2Mz_t) \tag{13}$$

From Formula (13), it is understood that the transmission symbols of other users give no interference to the reception signal of each user.

The reception signal converted into a baseband is input into a channel compensation part 303. The channel compensation part 303 of the u-th user, after dividing the input reception signal by $\beta a_{u,u}$, applies a Modulo operation. The Modulo output of the u-th user is given by the following formula.

[Formula 14]

$$\mathrm{Mod}_M(r_u/(\beta a_{u,u})) = d_u + 2Mz_{t,u} + 2Mz_{r,u} \tag{14}$$

Here, because $z_{r,u}$ is an equivalent expression of the Modulo operation applied in a receiver of the u-th user, the following formula holds.

[Formula 15]

$$z_{t,u} + z_{r,u} = 0 \tag{15}$$

Therefore, an output $\hat{r}_u$ of the channel compensation part 303 becomes the following formula.

[Formula 16]

$$\hat{r}_u = d_u \tag{16}$$

After that, the output of the channel compensation part 303 is input into a data demodulation part 305 and a channel decoding part 307, and transmission data of each user is detected after data demodulation and channel decoding are applied respectively.

2. MU-MIMO Blast ZF-THP

A base station apparatus configuration and a receiver configuration in a BLAST ZF-THP system are almost equivalent to those in FIGS. 9 and 14, respectively. What is different is a signal processing in the Precoding part 105 in the base station apparatus. Hereinafter, only the signal processing in the Precoding part 105 in the base station apparatus will be described.

Figure 15:
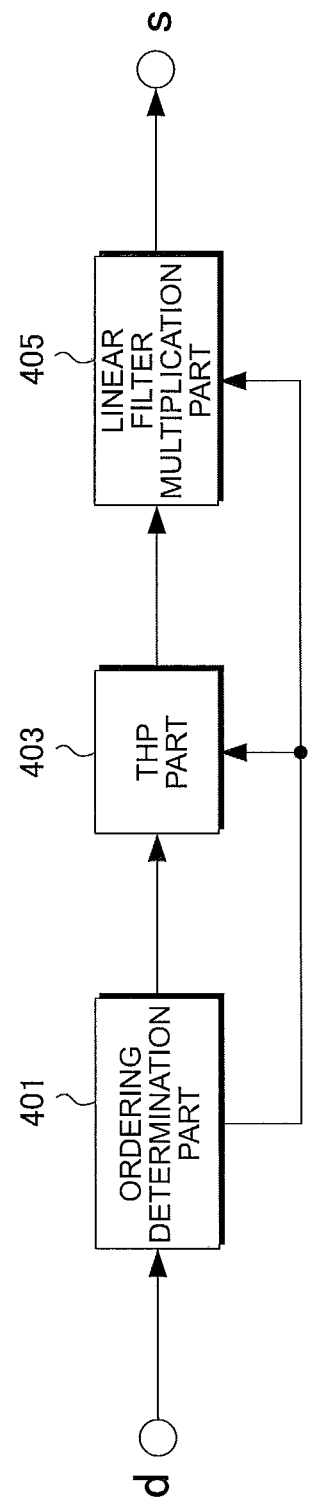
FIG. 15 is a block diagram showing a configuration of a Precoding part 105 in a BLAST ZF-THP system.

FIG. 15 is a block diagram showing a configuration of the Precoding part 105 in the BLAST ZF-THP system. In the Precoding part 105, the transmission symbol vector d is input into an ordering determination part 401 first, and appropriate rearrangement, i.e., ordering, is performed by a method described later. After that, the ordering-completed transmission symbol vector $d_p$ is input into a THP part 403, and based on a linear filter and channel matrix which are determined by the ordering determination part 401, a THP process is performed. An output of the THP part 403 is multiplied by a linear filter and transmit power normalization term in a linear filter multiplication part 405, and the transmission signal vector s is generated.

A determination method of an ordering order in the ordering determination part 401 will be described. Taking as example a case where the number of transmission antennas of the base station apparatus $N_t$ is three, and the number of users U is three, description thereof will be given. Besides, the number of reception antennas of a terminal of each user is assumed to be one. In the ordering determination part 401, an inverse matrix $H^{-1}$ for the channel matrix H is calculated first. The calculated inverse matrix $H^{-1}$ is made to be the linear filter W.

Here, it is assumed that W is defined by the following formula and constituted of three column vectors $\{w_1, w_2, w_3\}$.

[Formula 17]

$$W = H^{-1} = \begin{pmatrix} w_{1,1} & w_{1,2} & w_{1,3} \\ w_{2,1} & w_{2,2} & w_{2,3} \\ w_{3,1} & w_{3,2} & w_{3,3} \end{pmatrix} = (w_1 \quad w_2 \quad w_3) \qquad (17)$$

A column vector having the smallest norm is searched for among the column vectors constituting the linear filter W, and is stored as $w^{(1)}$. Besides, the norm $\|w\|$ of a certain column vector $w=[w_1, w_2, \ldots, w_M]^T$ is given by the following formula.

[Formula 18]

$$\|W\| = \sqrt{\sum_{m=1}^{M} |w_m|^2} \qquad (18)$$

Here, the norm of $w_2$ is supposed to have been the smallest, and $w^{(1)}$ is made to be equal to $w_2$. In the ordering determination part 401, after a second row that is a second user component of the channel matrix H and a third (=U) row that is a final row of the channel matrix are interchanged, zero is inserted in all of the third row that is the final row of the channel matrix. By this operation, elements with respect to a second user having the smallest norm of a weight vector are deleted from the channel matrix H. On the other hand, also with respect to the transmission symbol vector d, by interchanging a second row that is a second user component and a third row that is a final row are, the transmission symbol $d_2$ of a second user having the smallest norm of a weight vector will be substituted in a final row of the transmission symbol vector. When the channel matrix and transmission symbol vector before interchanging are $H^{(1)}$ and $d^{(1)}$, respectively, the channel matrix $H^{(2)}$ and $d^{(2)}$ after interchanging are given by the following formula.

[Formula 19]

$$H^{(2)} = \begin{pmatrix} h_{1,1} & h_{1,2} & h_{1,3} \\ h_{3,1} & h_{3,2} & h_{3,3} \\ 0 & 0 & 0 \end{pmatrix}, d^{(2)} = \begin{pmatrix} d_1 \\ d_3 \\ d_2 \end{pmatrix} \qquad (19)$$

Then, in the ordering determination part 401, an inverse matrix $H^{(2)-1}$ of the channel matrix $H^{(2)}$ in which an interchange has been performed is calculated, and is set as a new linear filter $W^{(2)}$. In the same way as mentioned above, among the column vectors constituting the linear filter $W^{(2)}$, a column vector having the smallest norm is searched for, and is stored as $w^{(2)}$. Besides, since elements for one user have been deleted by the process as mentioned above from the channel matrix, the number of vectors to be searched for will be (U−1). Here, a column vector of the j-th column is assumed to have been the smallest. After interchanging the j-th row that is the j-th user component and second (=(U−1)) row of the channel-matrix $H^{(2)}$ and the transmission symbol vector $d^{(2)}$, zero is inserted in all of the second (=(U−1)) row of the channel matrix. By this operation, elements with respect to the j-th user will be deleted from the channel matrix. The channel matrix and transmission symbol vector after interchanging are set as $H^{(3)}$ and $d^{(3)}$, respectively.

A transmission symbol vector $d^{(U)}$ generated after repeating the above process by the number of users will become a transmission signal vector $d_p$ for which the ordering has been carried out in the BLAST ZF-THP system, and is output as an ordering determination part 401 output. Therefore, since the transmission symbol of each user of the transmission signal vector $d_p$ will be arranged in descending order of the norm of the column vector of the linear filter W corresponding to the transmission symbol of each user, the ordering of the BLAST ZF-THP system can be reworded to be a system where an ordering order is going to be determined in ascending order of a required transmit power. Besides, supposedly, assuming that the ordering order is determined like $d^{(2)}=[d_1, d_3, d_2]^T$ of Formula (19), a transmission signal addressed to a user corresponding to $d_1$ is generated first, and a transmission signal addressed to a user corresponding to $d_2$ is generated last. On the other hand, the following formula where a column vector $\{w^{(1)}, w^{(2)}, w^{(3)}\}$ of the linear filter stored for every repetition is arranged in reverse order is output from the ordering determination part 401 as the linear filter W.

[Formula 20]

$$W = (w^{(3)} w^{(2)} w^{(1)}) \qquad (20)$$

The ordering-completed transmission signal vector $d_p$ and linear filter W which are output from the ordering determination part 401 are input into the THP part 403. In the THP part 403, in the same way as in the THP part 403 of the Precoding part 105 of the base station apparatus in the MU-MIMO THP system, the interference suppression process based on THP is performed. After interference suppression in the THP part 403 is performed, the multiplication of the linear filter W and the transmit power normalization are performed in the linear filter multiplication part 405, and an output of the Precoding part 105 is generated.

The above is a summary of the signal processing in the Precoding part 105 in the MU-MIMO BLAST ZF-THP system. Unlike the MU-MIMO THP, there is a problem that since the signal processing is required to be repeated by the number of concurrent access users in the Precoding part 105 of the base station apparatus, a calculation amount will increase greatly in proportion to increasing in the number of users. In the downlink MU-MIMO in which the sufficient number of transmission antennas exist in the base station apparatus, the spectrum efficiency increases in proportion to the number of space-multiplexing users, but in the BLAST ZF-THP system, since the signal processing amount will also increase greatly in proportion to the number of users, the complexity of the signal processing will give a limit to an improvement amount of the spectrum efficiency. Hereinafter, embodiments of the present invention will be described with reference to figures.

First Embodiment

A first embodiment according to the present invention targets a downlink MU-MIMO transmission where U mobile station apparatuses (users) each having a single reception antenna ($N_r$=1) and a base station apparatus having $N_t$ transmission antennas perform communication. It is to be noted that, in the first embodiment, although description is given with the number of reception antennas as $N_r$=1, the present invention is applicable also in the downlink MU-MIMO transmission between a plurality of mobile station apparatuses each having one or more reception antennas and the base station apparatus. Besides, in the present invention, the base station apparatus needs to know channel state information between each of mobile station apparatuses and the base station. Hereinafter, assuming that the channel state information is ideally notified to the base station apparatus from each of mobile station apparatuses, and that the base station apparatus knows the channel matrix H ideally, descriptions are given.

Figure 1:
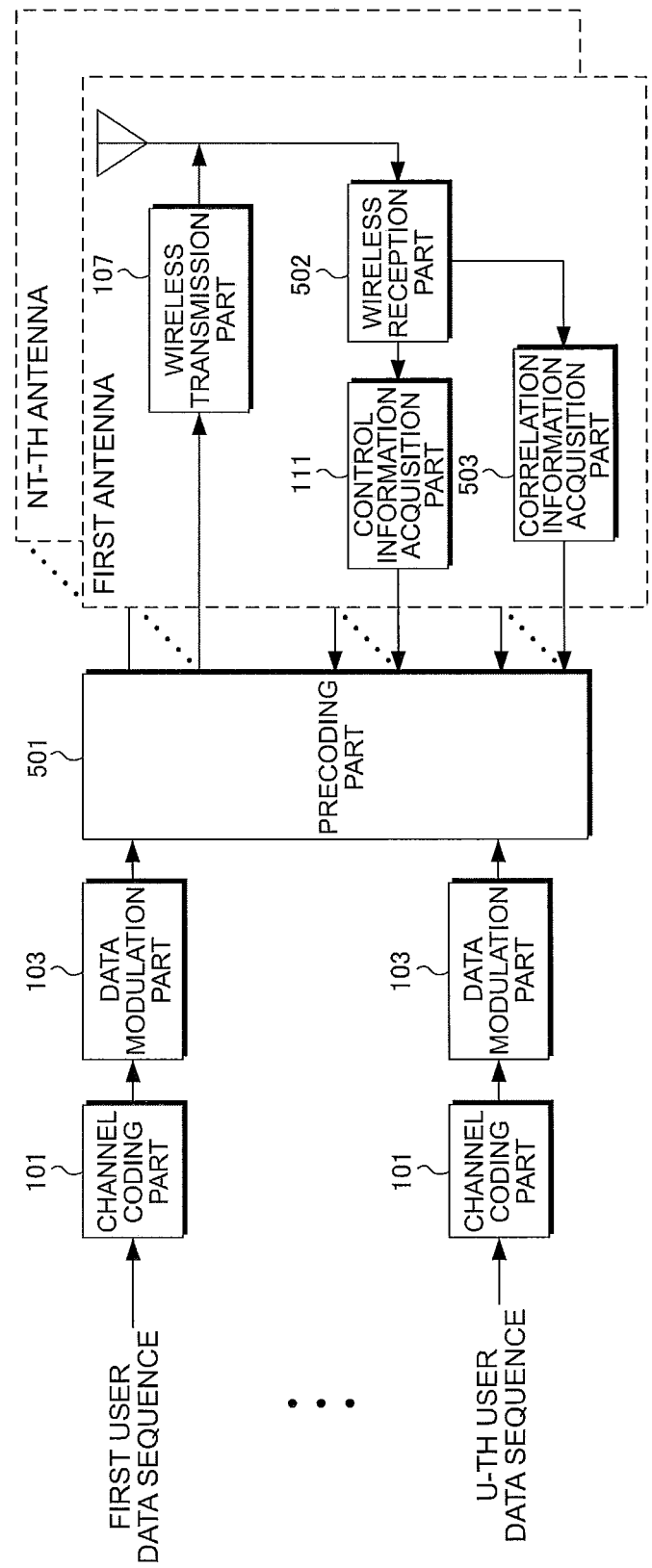
FIG. 1 is a block diagram showing a configuration of a base station apparatus according to a first embodiment of the present invention.

FIG. 1 is a block diagram showing a base station apparatus configuration according to the first embodiment of the present invention. A signal processing in the base station apparatus will be described. A transmission-data sequence of each user is, after subjected to channel coding in the channel coding part 101, data-modulated into QPSK, 16QAM or the like in the data modulation part 103. After that, a transmission symbol of each user is input into a Precoding part 501.

Figure 2:
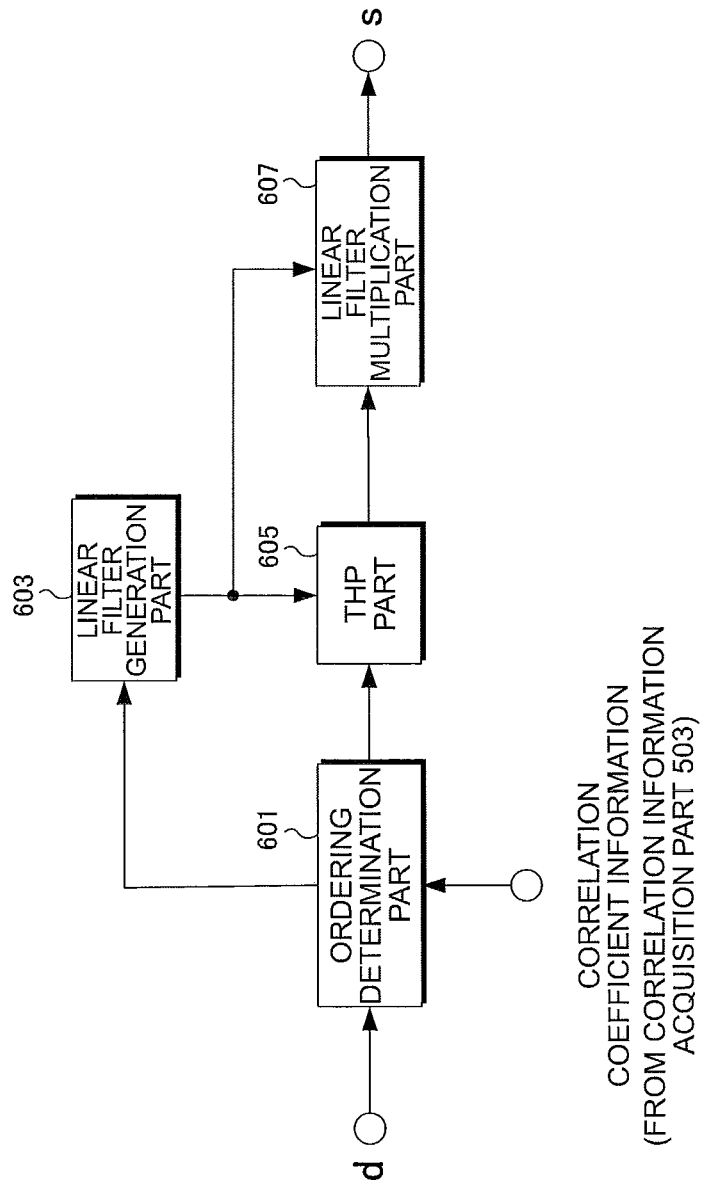
FIG. 2 is a block diagram showing a configuration of a Precoding part 501 according to the first embodiment of the present invention.

FIG. 2 is a block diagram showing a configuration of a Precoding part 501 according to the first embodiment of the present invention. A signal processing in the Precoding part 501 will be described. In the Precoding part 501, a transmission symbol vector d input first is input into an ordering determination part 601. A transmission symbol vector $d_p$ where the input d is multiplied by a certain permutation matrix Π is output from the ordering determination part 601 as the ordering-completed transmission symbol vector. $d_p$ is given by the following formula.

[Formula 21]

$$d_p = [d_{p,1}, \ldots, d_{p,U}]^T = \Pi d \quad (21)$$

Here, a permutation matrix is a matrix by which columns (or rows) of a certain matrix are interchanged, and for example, as for a third-order permutation matrix, there are a total of six kinds as shown by the following formula.

[Formula 22]

$$\begin{pmatrix} 1 & 0 & 0 \\ 0 & 1 & 0 \\ 0 & 0 & 1 \end{pmatrix}, \begin{pmatrix} 0 & 0 & 1 \\ 1 & 0 & 0 \\ 0 & 1 & 0 \end{pmatrix}, \begin{pmatrix} 0 & 1 & 0 \\ 0 & 0 & 1 \\ 1 & 0 & 0 \end{pmatrix}, \begin{pmatrix} 0 & 0 & 1 \\ 0 & 1 & 0 \\ 1 & 0 & 0 \end{pmatrix}, \quad (22)$$

$$\begin{pmatrix} 1 & 0 & 0 \\ 0 & 0 & 1 \\ 0 & 1 & 0 \end{pmatrix}, \begin{pmatrix} 0 & 1 & 0 \\ 1 & 0 & 0 \\ 0 & 0 & 1 \end{pmatrix}$$

Which permutation matrix is to be multiplied by depends on a desired ordering order. For example, in the case of the MU-MIMO BLAST ZF-THP system described in Background Art, selected is a permutation matrix corresponding to an ordering-completed transmission signal vector determined by the repetition signal processing in the Precoding part 501, and in the MU-MIMO THP system where the ordering is not performed, a unit matrix is selected as the permutation matrix. Hereinafter, how to choose a permutation matrix in the present invention, i.e., an ordering method will be described.

In an actual channel, there exists correlation in each of time, frequency and space. The ordering method in the present invention focuses attention on spatial correlation of channels. The spatial correlation mentioned here means how much mutual correlation a complex channel gain observed at each antenna (i.e., $\{h_{u,n}; u=1, \ldots, U, n=1, \ldots, N_t\}$) has. In the present invention, the attention is focused on the correlation among transmission antennas. In the case of a general cellular model, since an antenna height of the base station apparatus is arranged sufficiently high, there is no scattering body around the antenna of the base station apparatus. In this case, it is known that the correlation among antennas of the base station apparatus depends on a positional relationship between the mobile station apparatus and base station apparatus which are performing communication, and that generally in the case where a distance between the base station apparatus and the mobile station apparatus is large, the inter-antenna correlation becomes strong and in the case where the distance is small, the inter-antenna correlation becomes weak. In the downlink MU-MIMO, since a plurality of users distant spatially and the base station apparatus perform communication concurrently, a signal transmitted to each user will each receive a different influence of the correlation among antennas of the base station apparatus side, i.e., the different transmission antenna correlation. Here, the transmission correlation coefficient ρ(i, j, u) between the i-th transmission antenna and j-th transmission antenna of the base station apparatus, which influences a transmission signal addressed to the u-th user is defined by the following formula.

[Formula 23]

$$\rho(i, j, u) = \frac{E[h_{u,i} h_{u,j}^*]}{\sqrt{E[|h_{u,i}|^2] E[|h_{u,j}^*|^2]}} \quad (23)$$

Generally, it is known that in MIMO communication, transmission performances will deteriorate when the inter-antenna correlation becomes strong. This suggests that in such a case as the required power is compared among users and then ordering is carried out like the BLAST ZF-THP system, for example, a probability that the ordering is carried out from a user having a good transmission quality, i.e., a user having the small transmission antenna correlation is very high. Then, in the present invention, the transmission correlation coefficient of each user is compared, and the ordering order is going to be determined in ascending order of a correlation value. In the present invention, it is considered that the transmission correlation coefficient is estimated first in each of mobile station apparatuses.

Figure 3:
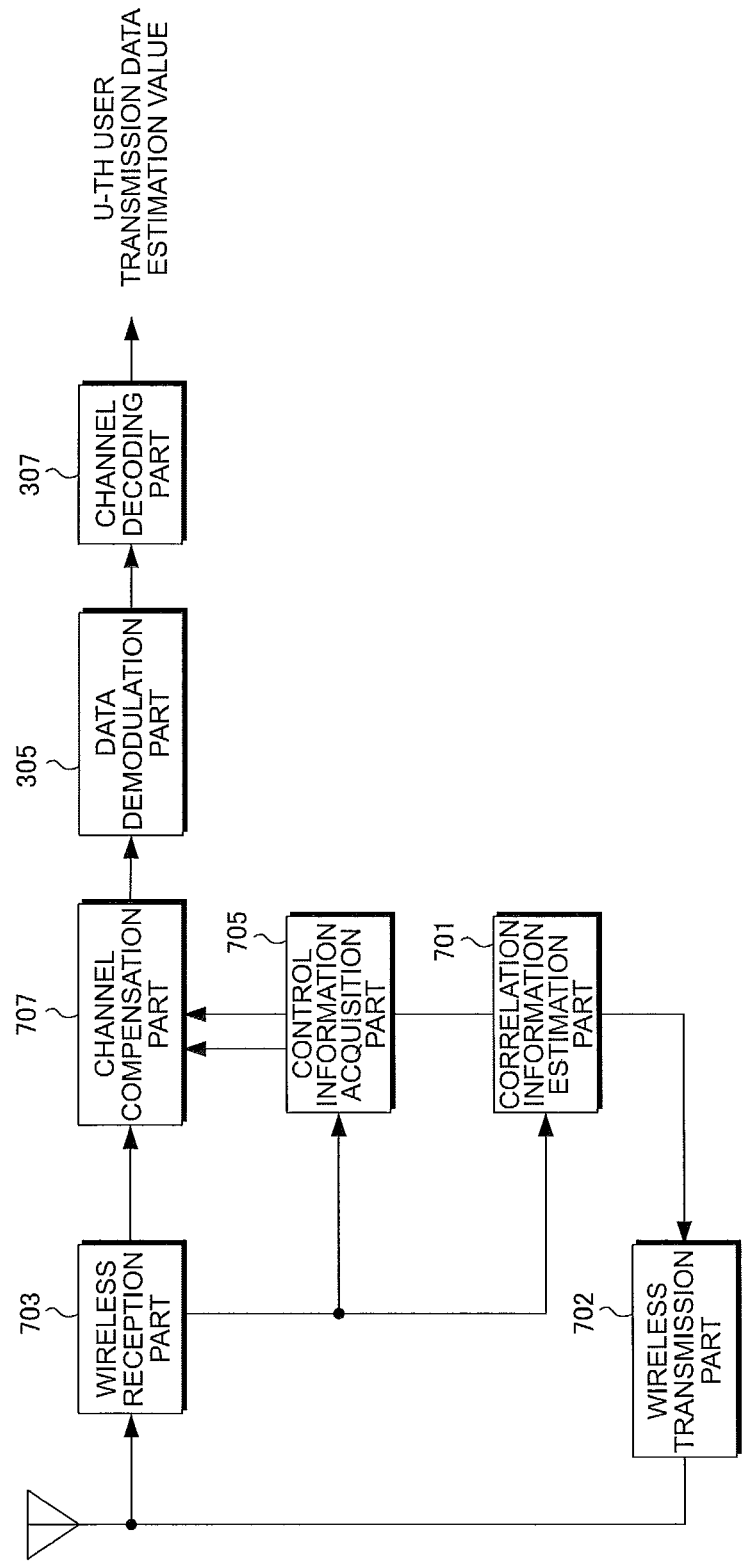
FIG. 3 is a block diagram showing a configuration of a mobile station apparatus according to the first embodiment of the present invention.

FIG. 3 is a block diagram showing a mobile station apparatus configuration according to the first embodiment of the present invention. In a correlation information estimation part 701 in each of mobile station apparatuses, transmission antenna correlation coefficient information observed in each of mobile station apparatuses is estimated. In the correlation information estimation part 701, for example, the correlation coefficient information can be estimated using a reference signal sequence transmitted from a base station apparatus. In addition, because the transmission correlation coefficient generally depends on a distance from the base station apparatus, the correlation coefficient may be estimated from distance information from the base station apparatus in the correlation information estimation part 701. In addition, each of mobile station apparatuses, without giving notification of the correlation coefficient information itself, may give notification of other information indicating the spatial correlation. For example, without estimating the correlation coefficient, the distance information from the base station apparatus may be notified to the base station apparatus as it is. In addition, in the case where the mobile station apparatus has a plurality of reception antennas, it also becomes possible to transmit a plurality of streams from the base station apparatus towards the mobile station apparatus, but the number of signal streams which the mobile station apparatus can receive depends on channel state information including the number of reception antennas and the inter-antenna correlation, and therefore, the mobile station apparatus may notify the base station apparatus of information on the desired number of signal streams, and thereby, may give notification the correlation coefficient information. A wireless transmission part (transmission part) 702 sends the estimated correlation coefficient information to the transmission antenna, and the correlation coefficient information is transmitted to the base station apparatus.

Returning to FIG. 1, the information notified from the correlation information estimation part 701 of each of mobile station apparatuses is input into a correlation information acquisition part 503 of the base station apparatus, and thereby, the base station apparatus acquires transmission correlation coefficient information. In the correlation information acquisition part 503, the transmission correlation coefficient information notified from the mobile station apparatus may be used as it is, and the transmission correlation coefficient may be estimated from other information indicating the spatial correlation notified from the mobile station apparatus. In addition, in the correlation information acquisition part 503, the correlation coefficient information may be estimated from other signals transmitted from the mobile station apparatus (for example, transmission data signals or the like of an uplink (a mobile station apparatus to a base station apparatus)) separately. The correlation information acquisition part 503 inputs the acquired transmission correlation coefficient information into the Precoding part 501.

Returning to FIG. 2, in the Precoding part 501, the input transmission correlation coefficient information is input into the ordering determination part 601. In the ordering determination part 601, the permutation matrix Π by which the transmission symbol vector can be interchanged is selected so that the transmission symbol addressed to a user having a large transmission correlation coefficient may be arranged in descending order. The symbol vector $d_p = [d_{p,1}, d_{p,2}, \ldots, d_{p,U}]^T$ where the transmission symbol vector d is multiplied by the selected permutation matrix Π is output from the ordering determination part 601. Besides, in this case, a transmission signal addressed to a user corresponding to $d_{p,1}$ is generated first, and a transmission signal addressed to a user corresponding to $d_{p,u}$ is generated last. That is, a transmission symbol addressed to a user having the largest correlation coefficient corresponds to $d_{p,1}$, and a transmission symbol addressed to a user having the smallest correlation coefficient corresponds to $d_{p,U}$.

At this time, as for the transmission correlation coefficient to be compared, the correlation coefficient between adjacent transmission antennas, i.e., ρ(i, i+1, u) may be compared among users, and the correlation coefficient between transmission antennas of another combination may be compared among users. In addition, the ordering order may be determined not based on the correlation coefficient itself but on the basis of other information indicating the spatial correlation. For example, in the case as notification of information on the desired number of signal streams is given, the allowable number of signal streams may be determined to be in inverse proportion to strength of the spatial correlation, and the ordering order may be determined such that the transmission symbol addressed to a user having the small allowable number of signal streams may be arranged in ascending order. The permutation matrix Π determined by the ordering determination part 601 is input also into a linear filter generation part 603.

In this way, in the present invention, the ordering order is determined based on correlation information. Incidentally, in such a system as a transmission antenna (antenna port) used for transmission of each transmission signal is determined by notification information or the like, it can be also said that determining an ordering order means determining an antenna port. Not only the present invention but the MU-MIMO which performs Precoding has performed nothing but further signal processing on the transmission signal for which the antenna port to be used for transmission has already been determined. Therefore, it can be also said that the present invention that determines the ordering order based on the correlation information determines the antenna port to be used in accordance with the correlation coefficient. Therefore, the present invention can be realized also by controlling control information that controls the antenna port to be used.

In FIG. 2, after the permutation matrix Π indicating the ordering order is determined in the ordering determination part 601, the linear filter W is calculated in the linear filter generation part 603. In the linear filter generation part 603, first, a matrix H'=ΠH where the channel matrix H is multiplied by the permutation matrix Π output from the ordering determination part 601 is defined as an equivalent channel matrix H'. Then, like the MU-MIMO THP system, such linear filter W as converts H' into the lower triangular matrix is calculated. When the Hermitian transposed matrix of H' is set as $(H')^H$ and the QR decomposition is applied to $(H')^H$, the following formula is acquired, and Q' becomes the linear filter.

[Formula 24]

$$(H')^H = Q'R'$$

$$\therefore H'Q' = R'^H \quad (24)$$

However, in the present invention, in order to keep a receiving quality of each user equal for every user, the following formula is used as the linear filter W.

[Formula 25]

$$W = Q'\{\text{diag}(R'^H)\}^{-1} \quad (25)$$

Besides, like the MU-MIMO THP system described in Background Art, Q' itself may be used as the linear filter without making the receiving quality of each user equal. In addition, as the linear filter, the linear filter calculated based on a minimum mean squared error (MMSE) criterion which makes minimum a mean squared error (MSE) of the transmission signal with the reception signal may be used.

The linear filter W and the equivalent channel matrix H' which are calculated in the linear filter generation part 603 are input into a THP part 605 and a linear filter multiplication part 607. In the THP part 605, the THP process is applied to the ordering-completed transmission symbol vector $d_p$ input from the ordering determination part 601 based on the linear filter W and the equivalent channel matrix H' which are input from the linear filter generation part 603. An output x of the THP part 605 is given by the following formula.

[Formula 26]

$$x = d_p - (H'W - I_U)x + 2Mz_t \quad (26)$$

The output x of the THP part 605, after that, is input into the linear filter multiplication part 607, and is multiplied by the linear filter W and the transmit power normalization term β, and the output s of the Precoding part 501 is calculated. The output s of the Precoding part 501 is given by the following formula.

[Formula 27]

$$s = \beta W x \quad (27)$$

Returning to FIG. 1, in the base station apparatus, after that, the output of the Precoding part 501 is input into the wireless transmission part 107 of each corresponding transmission antenna. In the wireless transmission part 107, a baseband signal is converted into a signal of a radio frequency (RF) band. Subsequently, the transmission signal of the RF band is transmitted to each of mobile station apparatuses from each transmission antenna.

Returning to FIG. 3, in each of mobile station apparatuses, the signal received in the reception antenna is input into a wireless reception part (reception part) 703, and is converted into the baseband signal in the wireless reception part 703. The reception signal converted into the baseband is given by the following formula.

[Formula 28]

$$r = H s = \beta H W x \quad (28)$$

The reception signal expressed by Formula (28) is input into a channel compensation part 707 of the mobile station apparatus, and division of the transmit power normalization term $\beta$ is carried out. Furthermore, because the following formula

[Formula 29]

$$\Pi^{-1} \Pi = I \quad (29)$$

and the following formula hold,

[Formula 30]

$$x = (H'W)^{-1}(d_p + 2M z_t) \quad (30)$$

the reception signal after the division of the transmit power normalization term $\beta$ is carried out is expressed as the following formula.

[Formula 31]

$$\begin{aligned} r/\beta &= \Pi^{-1} \Pi H W x \quad (31) \\ &= \Pi^{-1}(H'W)(H'W)^{-1}(d_p + 2M z_t) \\ &= \Pi^{-1}(\Pi d + 2M z_t) \\ &= d + 2M \Pi^{-1} z_t \end{aligned}$$

Subsequently, in the channel compensation part 707, a Modulo operation is applied to the reception signal after the division of the transmit power normalization term $\beta$ is carried out, and an output $\hat{r}$ of the channel compensation part 707 is calculated. However, in the ordering determination part 601 of the Precoding part 501 of the base station apparatus, it is not necessary to perform the Modulo operation in the channel compensation part 707 with respect to the user whose transmission symbol is ordered in the head of the transmission symbol vector. Whether the Modulo operation is to be carried out or not is controlled by control information notified from the base station apparatus. The output $\hat{r}$ of the channel compensation part 707 is expressed by the following formula.

[Formula 32]

$$\hat{r} = d + 2M \Pi^{-1} z_t + 2M z_r \quad (32)$$

Here, $z_r$ is the equivalent expression of the Modulo operation applied in the receiver, and since an inverse matrix $\Pi^{-1}$ of the permutation matrix $\Pi$ has only zero or one in each element, and also the determinant becomes one, the following formula is acquired.

[Formula 33]

$$\Pi^{-1} z_t + z_r = 0 \quad (33)$$

Therefore, the output $\hat{r}$ of the channel compensation part 707 becomes the following formula.

[Formula 34]

$$\hat{r} = d \quad (34)$$

After that, the output $\hat{r}$ of the channel compensation part 707 is input into a data demodulation part 305 and a channel decoding part 307, and after data demodulation and channel decoding are each applied, the transmission data of each user is detected.

Figure 4:
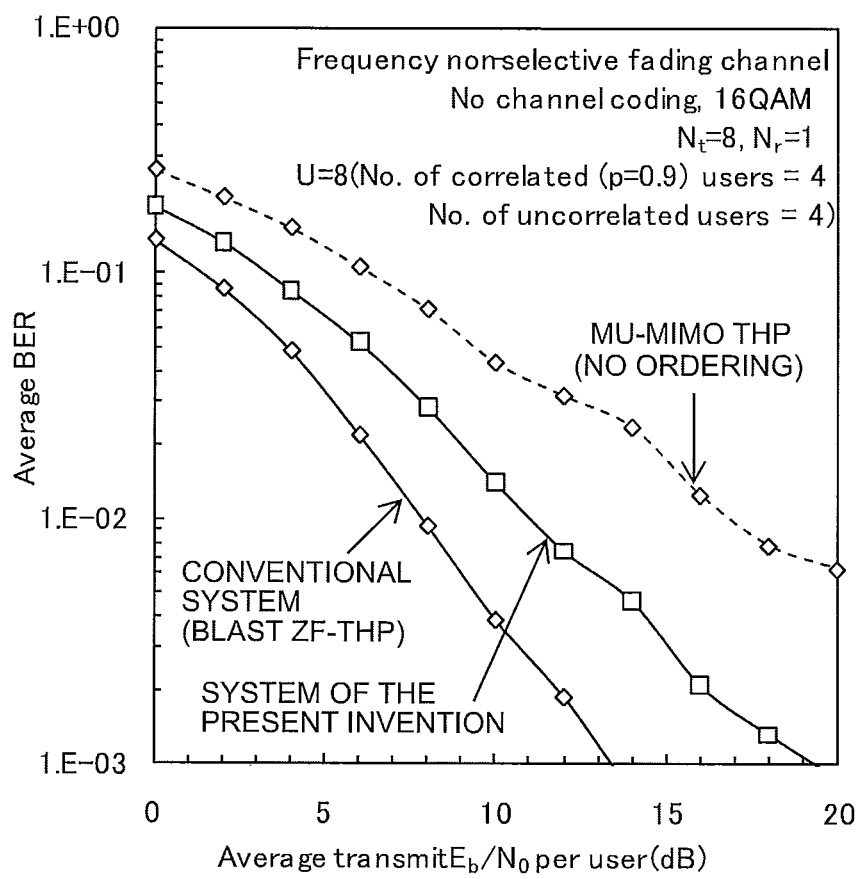
FIG. 4 is a graph showing an example of bit error rate (BER) characteristics achieved by the first embodiment of the present invention.

FIG. 4 is a graph showing an example of bit error rate (BER) characteristics achieved by the first embodiment of the present invention. The number of transmission antennas of the base station apparatus is set as $N_t = 8$, the number of multiple access users is set as $U = 8$, and the number of reception antennas is set as one. It is assumed that in mobile station apparatuses of a total of four users in all the users, strong transmission antenna correlation is observed, and that the transmission antenna correlation observed in a total of four remaining users is non-correlated. Data modulation is 16QAM and the channel coding is not applied. A channel is supposed to be a frequency-nonselective Rayleigh fading channel model. Modulo width M is set as $4\sqrt{10}$ which is the optimal value for the 16QAM modulation scheme. The channel estimation, transmission correlation coefficient estimation and the feedback of the information thereof to the base station apparatus in the mobile station apparatus are assumed to be performed ideally. The characteristics of the MU-MIMO THP system where the ordering is not performed and the MU-MIMO BLAST ZF-THP system are also shown together for comparison. Besides, the horizontal axis in FIG. 4 indicates transmission bit energy versus noise power density ratio ($E_b/N_0$) per user.

From FIG. 4, it is understood that the present invention can improve $E_b/N_0$ required for achieving BER=$10^{-2}$ by approximately 5 dB from the MU-MIMO THP system where a required calculation amount is almost the same, and on the other hand, can suppress deterioration of $E_b/N_0$ required for achieving BER=$10^{-2}$ to approximately 3 dB in comparison to the MU-MIMO BLAST ZF-THP system where an calculation amount increases greatly.

The present invention can perform determination of the required ordering order in the Precoding part 501 of the base station apparatus using only a value of the correlation coefficient among transmission antennas which is observed in each of mobile station apparatuses, and therefore, repeating processing is not required unlike the MU-MIMO BLAST ZF-THP system that is a conventional technology. Therefore, even if the number of users increases greatly, the increases of the calculation amount of the base station apparatus can be settled to be small, which can contribute to drastic reduction in the calculation amount. In the downlink MU-MIMO, because the spectrum efficiency is enhanced greatly in proportion to the number of users, the present invention capable of space-multiplexing many users with a small calculation amount can contribute also to dramatic increase in a transmission speed of the whole system.

Second Embodiment

The first embodiment targets the case where all the users perform nonlinear interference suppression based on THP. On the other hand, in order to perform the nonlinear interference suppression based on THP, it is necessary to calculate an interference component to be subtracted (for example, the second term of Formula (6)) for all the users. Therefore, the interference component to be calculated will also increase as the number of users increases, which will cause increase in the calculation amount. The second embodiment targets a case of making intermingled users who do not perform the nonlinear interference suppression based on THP and users who perform it in order to reduce the calculation amount required for the calculation of this interference component. Note that, in the same way as the first embodiment, although description is given with the number of reception antennas of each of mobile station apparatuses as $N_r=1$, the second embodiment is applicable also in the downlink MU-MIMO transmission between a plurality of mobile station apparatuses each having one or more reception antennas and the base station apparatus.

A base station apparatus configuration and mobile station apparatus configuration in the second embodiment are almost equivalent to those in FIGS. 1, 2 and 3. A different point is a signal processing in the Precoding part 501 of the base station apparatus and the channel compensation part 707 of the mobile station apparatus. First, the signal processing in the Precoding part 501 of the base station apparatus will be described. In FIG. 2, in the ordering determination part 601 of the Precoding part 501, in the same way as the first embodiment, the ordering order is determined based on the transmission antenna correlation coefficient, and the permutation matrix Π corresponding to the determined ordering order is selected, by which the transmission symbol vector d is multiplied. After that, also in the linear filter generation part 603, the linear filter W is calculated in the same way as the first embodiment.

Subsequently, the transmission symbol vector $d_p$ where the ordering has been carried out by the ordering determination part 601 is input into the THP part 605, and the interference suppression is performed. In the first embodiment, the interference suppression of all the users is performed in the THP part 605. In the second embodiment, for reducing the calculation amount, the interference suppression of THP for all users is not performed, and for the first user to the K-th user, a new linear filter $W_1$ is calculated in the linear filter generation part 603, by which the interference suppression is performed, and for only remaining (K+1)-th user to U-th user, performed is a THP-based interference suppression based on a linear filter $W_0$ which converts the channel matrix into the lower triangular matrix.

A calculation method of the linear filter $W_1$ in the linear filter generation part 603 will be described. A calculation method based on a ZF norm which suppresses interferences from other users completely will be described here, but a linear filter based on an MMSE norm may be used. First, an Hermitian transposed matrix $R'^H$ of an upper triangular matrix R' acquired by applying the QR decomposition to the $(H')^H$ is expressed as the following formula using a submatrix.

[Formula 35]

$$R'^H = \begin{pmatrix} a_{1,1} & \cdots & 0 & 0 & \cdots & 0 \\ \vdots & \ddots & \vdots & \vdots & \ddots & \vdots \\ a_{K,1} & \cdots & a_{K,K} & 0 & \cdots & 0 \\ a_{K+1,1} & \cdots & a_{K+1,K} & a_{K+1,K+1} & \cdots & 0 \\ \vdots & \ddots & \vdots & \vdots & \ddots & \vdots \\ a_{U,1} & \cdots & a_{U,K} & a_{U,K+1} & \cdots & a_{U,U} \end{pmatrix} = \begin{pmatrix} A_{1,1} & 0_{K \times (U-K)} \\ A_{2,1} & A_{2,2} \end{pmatrix} \quad (35)$$

Here, $A_{1,1}$, $A_{2,1}$ and $A_{2,2}$ are given by the following formula, and $0_{M \times N}$ indicates an M×N zero matrix in which all the elements are zero.

[Formula 36]

$$A_{1,1} = \begin{pmatrix} a_{1,1} & \cdots & 0 \\ \vdots & \ddots & \vdots \\ a_{K,1} & \cdots & a_{K,K} \end{pmatrix},$$

$$A_{2,1} = \begin{pmatrix} a_{K+1,1} & \cdots & a_{K+1,K} \\ \vdots & \ddots & \vdots \\ a_{U,1} & \cdots & a_{U,K} \end{pmatrix},$$

$$A_{2,2} = \begin{pmatrix} a_{K+1,K+1} & \cdots & 0 \\ \vdots & \ddots & \vdots \\ a_{U,K+1} & \cdots & a_{U,U} \end{pmatrix} \quad (36)$$

The linear filter $W_1$ is given by the following formula.

[Formula 37]

$$W_1 = \begin{pmatrix} (A_{1,1})^{-1} & 0_{K, U-K} \\ 0_{U-K, K} & I_{U-K} \end{pmatrix} \quad (37)$$

The transmission signal vector s which is multiplied by the linear filter $W_0$ and the linear filter $W_1$ is given by the following formula.

[Formula 38]

$$s = \beta W_1 W_1 d_p \quad (38)$$

In the case where the transmission signal given by Formula (38) is transmitted from the base station apparatus, a reception signal vector which has a reception signal received by each of mobile station apparatuses as an element is observed as the following formula.

[Formula 39]

$$r = Hs = \quad (39)$$
$$\beta \Pi^{-1} \Pi H W_0 W_1 d_p = \beta \Pi^{-1} R'^H W_1 d_p = \beta \Pi^{-1} \begin{pmatrix} I_K & 0 \\ A_{2,1} A_{1,1}^{-1} & A_{2,2} \end{pmatrix} d_p$$

From Formula (39), it is understood that the reception signal of users for which the ordering has been carried out from the first row up to the K-th row of $d_p$ has received no interference from other users, and that on the other hand, with respect to the reception signal of users arranged after the (K+1)-th row, an interference has been received from transmission signals addressed to other users.

Then, in the THP part 605 of the Precoding part 501 of the base station apparatus, the THP-based interference suppression is performed only for the transmission symbol for which the ordering has been carried out after (K+1)-th row of $d_p$. The output signal x of the THP part 605 for which such interference suppression has been performed is input into the linear filter multiplication part 607, and is multiplied by the linear filter $W_0$, the linear filter $W_1$ and the transmit power normalization term $\beta$, and the output signal s of the Precoding part 501 is generated. Since a signal processing in the base station apparatus other than the Precoding part 501 is the same as first embodiment, description will be omitted.

Subsequently, a signal processing of each of mobile station apparatuses will be described. A configuration of the mobile station apparatus is almost equivalent to that in FIG. 3, and a signal processing in the channel compensation part 707 differs. In the channel compensation part 707, for the reception signal, the Modulo operation is performed after the division of the transmit power normalization term is performed, but with respect to users for which the ordering has been carried out from the first row up to the K-th row of $d_p$ in the Precoding part 501 of the base station apparatus, the Modulo operation in the channel compensation part 707 may not be performed. Whether the Modulo operation is to be carried out or not is controlled by control information notified from the base station apparatus.

Note that, the ordering order determined in the Precoding part 501 of the base station apparatus depends on the transmission correlation coefficient observed in each of mobile station apparatuses, and the larger the transmission correlation coefficient the transmission symbol addressed to the mobile station apparatus has, the very higher is the probability that the ordering order will be in the vicinity of the head. Then, in the channel compensation part 707 of the mobile station apparatus, based on the correlation coefficient information acquired by the correlation information estimation part 701 of the mobile station apparatus, control may be carried out so that the Modulo operation may not be performed at any time in the case of large correlation coefficient, and the Modulo operation may be always performed in the case of small correlation coefficient. Because the signal processing in the mobile station apparatus is the same as that of the first embodiment except the signal processing in the channel compensation part 707, description will be omitted.

Figure 5:
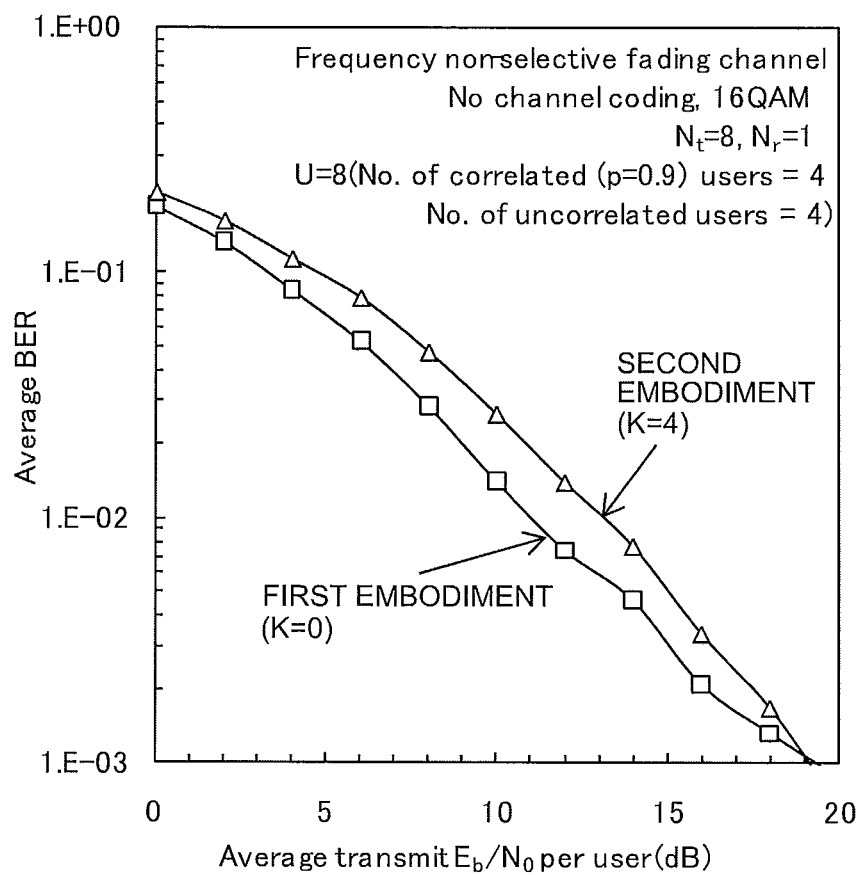
FIG. 5 is a graph showing an example of BER characteristics achieved by a second embodiment of the present invention.

FIG. 5 is a graph showing an example of BER characteristics achieved by the second embodiment of the present invention. Transmission conditions are the same as those in FIG. 4 shown in the first embodiment, and the number of users K where the interference suppression is performed only by the linear filter in the second embodiment is set as four. From FIG. 5, it is understood that in the second embodiment, it is possible to suppress deterioration of $E_b/N_0$ required for achieving BER=$10^{-2}$ to approximately 2 dB while reducing the calculation amount in comparison with the case of performing the interference suppression of all users based on THP (that is, first embodiment).

In the second embodiment, the THP-based interference suppression is not performed for all users, but performed only for a part of users, and thereby, it becomes possible to perform the downlink MU-MIMO transmission with the calculation amount smaller than that of the first embodiment. In addition, in the mobile station apparatus receiving the transmission signal where the interference suppression is performed only by the linear filter, the Modulo operation is not required, and therefore, it becomes possible to also make space-multiplexed between the mobile station apparatus which does not have a Modulo operation function and the mobile station apparatus which has a Modulo operation function.

Third Embodiment

In the first embodiment, performing the ordering in the Precoding part 501 of the base station apparatus based on only the transmission correlation coefficient enables the downlink MU-MIMO transmission with the calculation amount smaller than that of the conventional MU-MIMO BLAST ZF-THP system, but a little deterioration of transmission performances has arisen in contrast to the conventional system. A third embodiment targets a case where deterioration of transmission performances is suppressed to the minimum by not performing the ordering in the Precoding part 501 of the base station apparatus based on only the transmission correlation coefficient, but using together also the method of the conventional MU-MIMO BLAST ZF-THP system.

A base station apparatus configuration in the third embodiment is almost the same as that of the first and the second embodiments. What is different is a signal processing in the ordering determination part 601 in the Precoding part 501 of the base station apparatus. The signal processing in the ordering determination part 601 will be described. In the ordering determination part 601, first, the ordering is performed by a certain number of users L based on the same method as the signal processing which is performed in the ordering determination part 601 of the BLAST ZF-THP system. After that, with respect to (U-L) users for which the ordering order has not been determined yet, the ordering is performed based on only the transmission antenna correlation coefficient observed in the mobile station apparatus of each user in the same way as the first embodiment. That is, the transmission symbol vector $d_p$ to which the ordering has been applied is shown by the following formula.

[Formula 40]

$$d_p = [d_{p,1}, d_{p,2}, \ldots, d_{p,U-L}, d_{p,U-L+1}, \ldots, d_{p,U}]^T \quad (40)$$

With respect to the first half portion $[d_{p,1}, \ldots, d_{p,U-L}]^T$ of the transmission symbol vector, the ordering order will be determined based on only the transmission correlation coefficient information, and with respect to the last half portion $[d_{p,U-L+1}, \ldots, d_{p,U}]^T$, the ordering order will be determined based on the MU-MIMO BLAST ZF-THP system. Therefore, in the third embodiment, in the ordering determination part 601, a repetition signal processing by the number of users L where the ordering order is determined based on the MU-MIMO BLAST ZF-THP system is required unlike the first and the second embodiments.

By taking a large number as the number of users L which determines the ordering order by the repeating processing, it is possible to improve the transmission performances, but the calculation amount required in the base station apparatus will also increase. In the Precoding part 501 of the base station apparatus, the value of L is changed adaptively so that the desired transmission performances and calculation amount may be achieved in accordance with the transmission correlation coefficient information and the channel matrix H which are notified from each of mobile station apparatuses. In addition, in the same way as the second embodiment, after the ordering order is determined, the interference suppression by the THP part 605 is not performed by a certain number of users K, and the interference suppression is performed only by the linear filter, and thereby, it is also possible to reduce the calculation amount.

Figure 6:
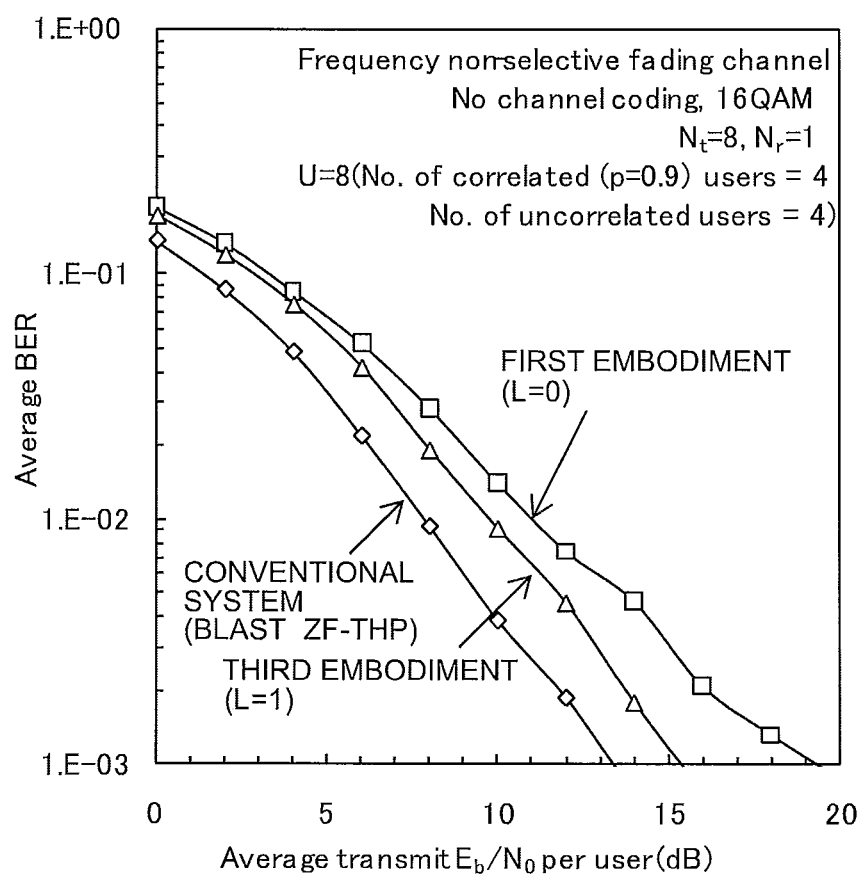
FIG. 6 is a graph showing an example of BER characteristics achieved by a third embodiment of the present invention.

FIG. 6 is a graph showing an example of BER characteristics achieved by the third embodiment of the present invention. Conditions are the same as those in FIG. 4 shown in the first embodiment, and with respect to the number of users whose ordering orders are determined based on repeating processing in the third embodiment, L is set as L=1, and all the users have interference suppression performed based on THP. From FIG. 6, it is understood that the system according to the third embodiment can improve $E_b/N_0$ required for achieving BER=$10^{-2}$ by approximately 1 dB in comparison with the first embodiment, and can suppress deterioration of $E_b/N_0$ required for achieving BER=$10^{-2}$ to approximately 2 dB in comparison to the MU-MIMO BLAST ZF-THP system.

In the third embodiment, by combining the ordering system which is performed based on only the transmission correlation coefficient and the ordering system which is performed based on the MU-MIMO BLAST ZF-THP system, it becomes possible always to acquire the best transmission performance improvement effect and calculation amount reduction effect in accordance with a channel state.

Fourth Embodiment

The first, second and third embodiments target a narrow-band single-carrier transmission. Meanwhile, in a next generation mobile radio communication system (for example, fourth generation mobile radio communication system), realization of an ultra high throughput is required. For realizing the high-speed transmission, widening of communication bandwidth is indispensable. As one of important alternatives for a broadband wireless communication access method, multi-carrier-based access methods represented by an orthogonal frequency division multiple access (OFDMA) transmission system and a multi-carrier code division multiple access (MC-CDMA) transmission system have been investigated. The fourth embodiment targets an OFDM transmission that is a kind of a multi-carrier transmission.

The OFDM transmission is a system which performs parallel transmission with a plurality of different frequencies (referred to as subcarriers) allocated to a plurality of transmission symbols. As for subcarrier frequencies, frequencies where the transmission symbols transmitted in parallel do not give interference mutually, and where the maximum spectrum efficiency can be achieved are selected. An OFDM signal which can transmit $N_c$ transmission symbols in parallel by $N_c$ optimal subcarriers is generated by an Inverse discrete Fast Fourier Transform (IFFT) of $N_c$ points. Since in the OFDM signal generated in such a way, the signals allocated to each subcarrier do not interfere with each other, the signal processing described in the first embodiment is applied independently for every subcarrier, and thereby, it becomes possible to apply the present invention also in the OFDM transmission.

Figure 7:
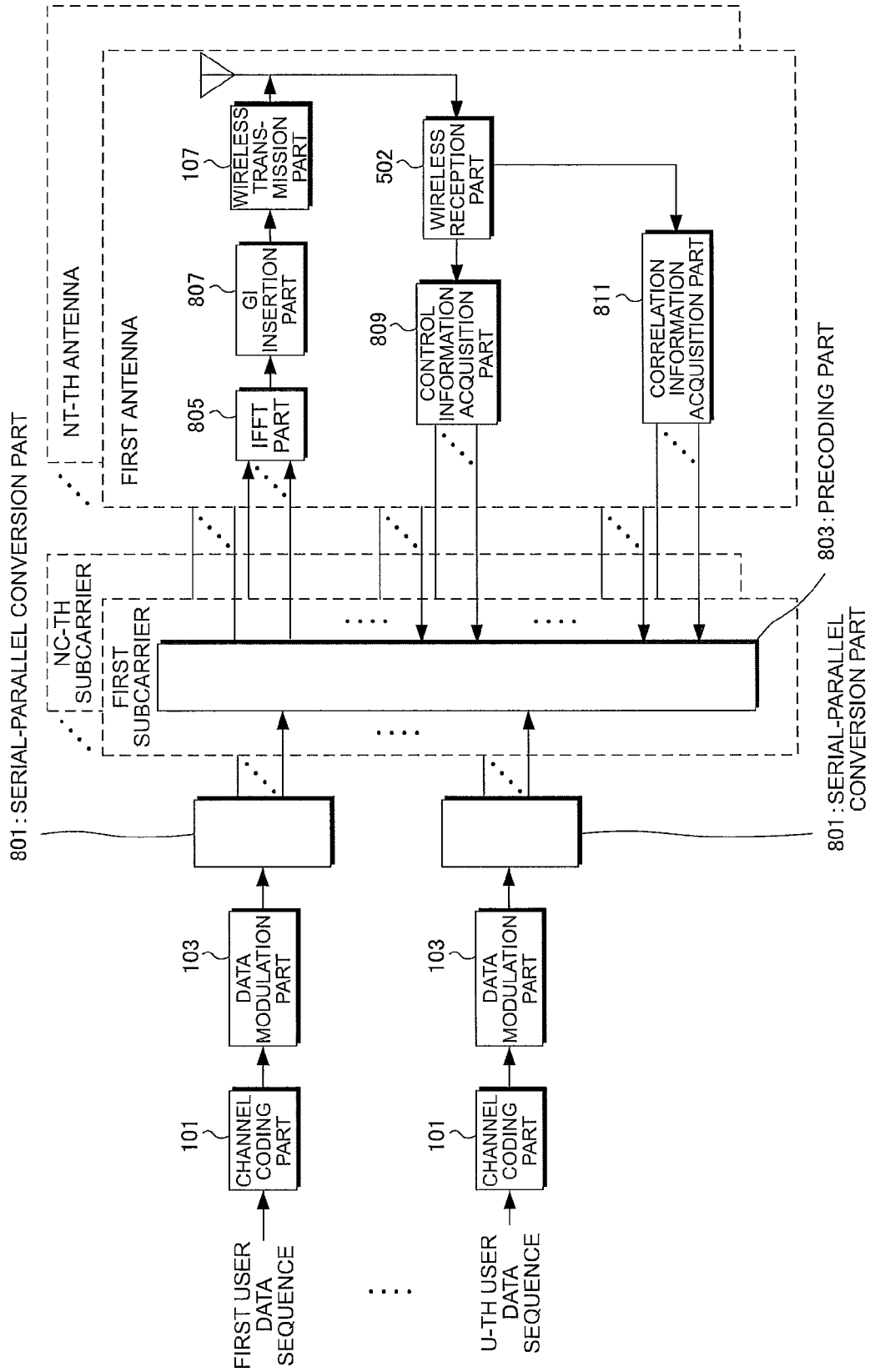
FIG. 7 is a block diagram showing a configuration of a base station apparatus according to a fourth embodiment of the present invention.

FIG. 7 is a block diagram showing a base station apparatus configuration according to the fourth embodiment of the present invention. Besides, the number of antennas, etc. is assumed to be the same as first embodiment. Transmission data addressed to each user, after being input into the channel coding part 101 and data modulation part 103, is input into a serial-parallel conversion part 801, and is converted into parallel data. The transmission symbol converted into the parallel is transmitted using each subcarrier. A signal processing for a transmission symbol transmitted by the k-th subcarrier will be described. The transmission symbol of the k-th subcarrier of each user is input into a Precoding part 803 in the k-th subcarrier, and the transmission signal of each transmission antenna which is transmitted by the k-th subcarrier is calculated.

A signal processing in the Precoding part 803 will be described. A configuration of the Precoding part 803 is the same as that shown in FIG. 2, and the transmission signal vector, the channel matrix, the correlation coefficient information, and a generated linear filter matrix will each be associated with to each subcarrier. However, because the correlation coefficient information takes almost the same value in all the subcarriers unless frequencies differ greatly, a permutation matrix selected in the ordering determination part 601 can be used in common to all the subcarriers. In the BLAST ZF-THP system that is a conventional system, the calculation amount required for determining the ordering will increase greatly in proportion to the number of subcarriers since the ordering order differs for every subcarrier, but according to the present invention, the calculation amount required for determining the ordering does not depend on the number of subcarriers.

An output of the Precoding part 803 of each subcarrier is input into an IFFT part 805 of each corresponding transmission antenna. In the IFFT part 805, using all the input subcarrier components, an IFFT process is applied and an OFDM transmission signal is generated. The generated OFDM signal is input into a GI insertion part 807, and is input into the wireless transmission part 107 of each transmission antenna after a guard interval (GI) is inserted, and is converted from a baseband signal to a RF-band signal. The transmission signal converted into the RF band is each transmitted to a plurality of mobile station apparatuses from the transmission antenna.

Figure 8:
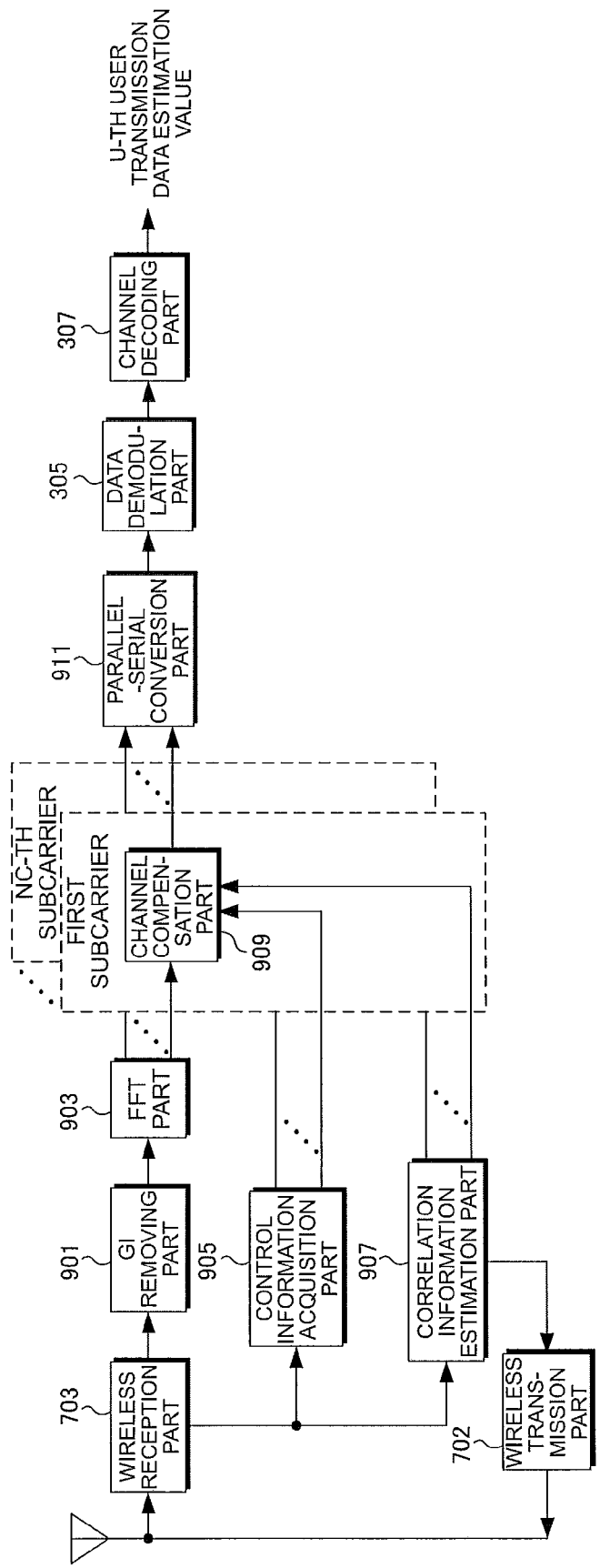
FIG. 8 is a block diagram showing a configuration of a mobile station apparatus according to the fourth embodiment of the present invention.

FIG. 8 is a block diagram showing a configuration of the mobile station apparatus according to the fourth embodiment of the present invention. In the mobile station apparatus, a received signal is input into the wireless reception part 703, and an RF-band signal is converted into a baseband signal. The signal converted into the baseband is input into a GI removing part 901, and is input into an FFT part 903 after the GI is removed, and is decomposed into subcarrier components by that an FFT process having the same point number as the IFFT process in the IFFT part 805 of the base station apparatus is performed. The reception signal decomposed into subcarrier components is input into a channel compensation part 909 corresponding to each subcarrier, and channel compensation, i.e., the division of the transmit power normalization term and the Modulo operation are applied in the same way as the first embodiment. An output of the channel compensation part 909 is input into a parallel-serial conversion part 911, and is input into the data demodulation part 305 and the channel decoding part 307 after the parallel series conversion is performed, and data demodulation and channel decoding are performed, and the transmission data transmitted from the base station apparatus is detected.

The present embodiment targets the OFDM transmission. In the case of applying the conventional MU-MIMO BLAST ZF-THP system to the OFDM transmission, it is necessary to carry out different ordering for every subcarrier, and therefore, the calculation amount will increase greatly in proportion to the number of subcarriers. On the other hand, according to the present invention, the calculation amount does not depend on the number of subcarriers because the ordering can be common to all subcarriers. Therefore, it will become possible to reduce the calculation amount greatly as compared with a conventional system. In addition, although the present invention targets the multi-carrier transmission, that the ordering order can be common in all frequencies allows the same thing to be said even in the case where the present invention is applied, for example, to the single-carrier transmission where a frequency division multiplexing is performed.

Programs which operate in the mobile station apparatus and the base station apparatus according to the present invention are the programs (program making a computer function) which control a CPU, etc. so as to realize functions of the above-mentioned embodiments according to the present invention. Then, information handled in these apparatuses are accumulated temporarily in a RAM at the time of the processing, and after that, are stored in various ROMs or a HDD, and read-out, correction and writing-in are performed as necessary by the CPU. A recording medium which stores the programs may be any of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disk, or the like), or the like. In addition, not only the functions of embodiments mentioned above are realized by executing the loaded programs, but also the functions of the present invention may be realized by carrying out processing based on instructions of the programs in association with an operating system or other application programs.

In addition, in the case of circulating the programs in a market, it is possible to circulate the programs with them stored in a portable-type recording medium, or to transfer the programs to a connected server computer via a network such as the Internet. In this case, a storage device of the server computer is also included in the present invention. In addition, a part or all of the mobile station apparatuses and base station apparatus in the embodiments mentioned above may be realized typically as an LSI which is an integrated circuit. Each functional block of the mobile station apparatus and base station apparatus may be made to be a processor individually, and may be made to be a processor with a part or all integrated. In addition, a method of integrating circuits may be realized not only by a LSI, but by a dedicated circuit or a general-purpose processor. In addition, in the case where a technology of integrating circuits which is substituted for a LSI appears owing to a progress of a semiconductor technology, it is also possible to use integrated circuits based on this technology.

As mentioned above, embodiments of this invention has been described in full detail with reference to the drawings, and specific configurations are not limited to these embodiments, and a design etc. within a scope not departing from substance of this invention are also included in the scope of Claims.

DESCRIPTION OF SYMBOLS

101 Channel coding part
103 Data modulation part
105, 501, 803 Precoding part
107 Wireless transmission part
201, 403, 605 THP part
203, 603 Linear filter generation part
205, 405, 607 Linear filter multiplication part
301, 703 Wireless reception part
303, 707, 909 Channel compensation part
305 Data demodulation part
307 Channel decoding part
401, 601 Ordering determination part
503 Correlation information acquisition part
701 Correlation information estimation part
801 Serial-parallel conversion part
805 IFFT part
807 GI insertion part
901 GI removing part
903 FFT part
911 Parallel-serial conversion part

The invention claimed is:

1. A transmission apparatus which is provided with a plurality of transmission antennas and a computer, and transmits a wireless signal to a plurality of reception apparatuses, wherein based on information indicating spatial correlation of channels between the transmission apparatus and said plurality of reception apparatuses, a transmission signal addressed to said each reception apparatus is generated, and said generated each transmission signal is space-multiplexed in the same wireless resource, and transmitted to said each reception apparatus; said transmission apparatus comprising:
 an ordering determination part performed by the computer to determine an order in which a transmission signal addressed to said each reception apparatus is generated based on said information indicating spatial correlation of channels;
 a linear filter generation part performed by the computer to generate a linear filter based on said determined order;
 a THP part performed by the computer to carry out THP (Tomlinson Harashima Precoding) processing by using said determined order and said linear filter;
 and
 a linear filter multiplication part performed by the computer to multiply an output of said THP part by said linear filter, wherein
 said transmission apparatus generates successively from a transmission signal addressed to a reception apparatus said information indicating spatial correlation of channels of which is large, a transmission signal addressed to said each reception apparatus.

2. The transmission apparatus according to claim 1, wherein
 said information indicating spatial correlation of channels is a transmission correlation coefficient indicating correlation among said plurality of transmission antennas.

3. The transmission apparatus according to claim 2, wherein
 said transmission correlation coefficient is acquired based on at least one of information notified from said plurality of reception apparatuses, and information estimated in its own apparatus.

4. The transmission apparatus according to claim 2, wherein
 a transmission signal addressed to said each reception apparatus is generated in association with said transmission correlation coefficient.

5. The transmission apparatus according to claim 1, wherein
 a transmission signal addressed to said each reception apparatus is generated sequentially without depending on wireless resources allocated to said each reception apparatus.

6. The transmission apparatus according to claim 1, wherein
 an antenna port to be used is determined by determining an order in which a transmission signal addressed to said each reception apparatus is generated based on said information indicating spatial correlation of channels.

7. An integrated circuit causing a transmission apparatus to exert a plurality of functions by being mounted in said transmission apparatus, the functions comprising a series of functions of:
- transmitting a wireless signal to a plurality of reception apparatuses by using a plurality of transmission antennas;
- determining an order in which a transmission signal addressed to said each reception apparatus is generated based on information indicating spatial correlation of channels between the transmission apparatus and said plurality of reception apparatuses;
- generating a linear filter based on said determined order;
- performing a THP (Tomlinson Harashima Precoding) process by using said determined order and said linear filter;
- multiplying an output after said THP process by said linear filter;
- generating a transmission signal addressed to said each reception apparatus based on said determined order, wherein said generating includes generating successively from a transmission signal addressed to a reception apparatus said information indicating spatial correlation of channels of which is large, a transmission signal addressed to said each reception apparatus;
- space-multiplexing said generated each transmission signal in the same wireless resource; and
- transmitting said each transmission signal to said each reception apparatus.

\* \* \* \* \*